United States Patent
Kojima

(10) Patent No.: US 11,218,100 B2
(45) Date of Patent: Jan. 4, 2022

(54) ROTARY MACHINE CONTROL DEVICE

(71) Applicant: Mitsubishi Electric Corporation, Tokyo (JP)

(72) Inventor: Tetsuya Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/756,857

(22) PCT Filed: Nov. 16, 2018

(86) PCT No.: PCT/JP2018/042569
§ 371 (c)(1),
(2) Date: Apr. 17, 2020

(87) PCT Pub. No.: WO2019/138692
PCT Pub. Date: Jul. 18, 2019

(65) Prior Publication Data
US 2021/0194401 A1    Jun. 24, 2021

(30) Foreign Application Priority Data
Jan. 12, 2018   (JP) .............................. JP2018-003787

(51) Int. Cl.
*H02P 21/18*      (2016.01)
*H02P 21/22*      (2016.01)
(Continued)

(52) U.S. Cl.
CPC .............. *H02P 21/18* (2016.02); *H02P 6/182* (2013.01); *H02P 21/0017* (2013.01);
(Continued)

(58) Field of Classification Search
CPC .......... H02P 21/18; H02P 21/22; H02P 21/26; H02P 6/182; H02P 21/0017; H02P 21/13
See application file for complete search history.

(56) References Cited

U.S. PATENT DOCUMENTS 5,144,564 A    9/1992 Naidu et al.
6,646,409 B2   11/2003 Won et al.
(Continued)

FOREIGN PATENT DOCUMENTS

CN    107171610 A    9/2017
EP    2493067 A1     8/2012
(Continued)

OTHER PUBLICATIONS

Indian Office Action dated Mar. 17, 2021 in Indian Application No. 202027022051.
(Continued)

*Primary Examiner* — Cortez M Cook
(74) *Attorney, Agent, or Firm* — Xsensus LLP

(57) ABSTRACT

A rotary machine control device for controlling a rotary machine whose inductance has an inductance variable component that changes with a rotor position includes a current detector detecting rotary machine current flowing through the rotary machine; and a speed estimator computing estimated rotational speed that is an estimated value of rotational speed of a rotor, based on motional electromotive force that is induced voltage generated due to change in the inductance with a rotor position. The rotary machine control device includes a position computing unit computing an estimated position that is an estimated value of the rotor position, using the estimated rotational speed; and a controller outputting a rotary machine voltage instruction to drive the rotary machine, based on the rotary machine current and the estimated position. The rotary machine control device includes a voltage applicator applying voltage to the rotary machine based on the rotary machine voltage instruction.

16 Claims, 13 Drawing Sheets

(51) Int. Cl.
  *H02P 21/26* (2016.01)
  *H02P 6/182* (2016.01)
  *H02P 21/00* (2016.01)
  *H02P 21/13* (2006.01)

(52) U.S. Cl.
  CPC .............. *H02P 21/13* (2013.01); *H02P 21/22* (2016.02); *H02P 21/26* (2016.02)

(56) References Cited

U.S. PATENT DOCUMENTS

| | | | |
|---|---|---|---|
| 8,350,507 | B2 | 1/2013 | Ito et al. |
| 8,610,388 | B2 | 12/2013 | Ito et al. |
| 2001/0028236 | A1 | 10/2001 | Cheong |
| 2004/0155613 | A1* | 8/2004 | Sugiyama .............. B62D 5/046 318/400.14 |
| 2008/0297099 | A1* | 12/2008 | Maekawa ............... H02P 21/18 318/799 |
| 2012/0212215 | A1 | 8/2012 | Veijanen |
| 2014/0200767 | A1* | 7/2014 | Mikamo .................. H02P 6/12 701/41 |

FOREIGN PATENT DOCUMENTS

| | | |
|---|---|---|
| JP | 3410451 B2 | 3/2003 |
| JP | 2003-319697 A | 11/2003 |
| JP | 3571698 B2 | 9/2004 |
| JP | 4644010 B2 | 3/2011 |
| JP | 5069306 B2 | 11/2012 |
| JP | 5324646 B2 | 10/2013 |

OTHER PUBLICATIONS

International Search Report and Written Opinion dated Feb. 19, 2019 for PCT/JP2018/042569 filed on Nov. 16, 2018, 6 pages including English Translation of the International Search Report.
Ichikawa, S., "Sensorless Controls of Salient-Pole Permanent Magnet Synchronous Motors Using Extended Electromotive Force Models," T. IEE Japan, vol. 122-D, No. 12, 2002, pp. 1088-1096 (English Abstract).

* cited by examiner

ROTARY MACHINE CONTROL DEVICE

CROSS-REFERENCE TO RELATED APPLICATIONS

The present application is based on PCT filing PCT/JP2018/042569, filed Nov. 16, 2018, which claims priority to JP 2018-003787, filed Jan. 12, 2018, the entire contents of each are incorporated herein by reference.

FIELD

The present invention relates to a control device for a rotary machine (hereinafter referred to as "rotary machine control device") that controls a rotary machine whose inductance value changes with the rotor position, by obtaining rotor position information without use of a position sensor for detecting the rotor position.

BACKGROUND

Driving a rotary machine to operate at full performance of the rotary machine requires rotor position information. To this end, a conventional rotary machine control device uses position information detected by a position sensor provided on the rotary machine. However, in view of further reduction of manufacturing cost of rotary machines, size reduction of rotary machines, higher reliability of rotary machines, and the like, technology to drive a rotary machine in a position-sensorless configuration has been developed. Position-sensorless control methods for a rotary machine include a method of estimating the rotor position by applying a high frequency voltage to the rotary machine, and a method of estimating the rotor position on the basis of induced voltage, flux linkage, or the like of the rotary machine without applying a high frequency voltage. Patent Literature 1 discloses a method of estimating the rotor position by applying a high frequency voltage to the rotary machine. The position-sensorless control method disclosed in Patent Literature 1 includes detecting of a rotary machine current when a high frequency voltage is applied to a rotary machine, and extracting of a high frequency current having the same frequency component as the frequency component of the high frequency voltage. Then, the rotor position is estimated using the characteristic that the inductance of the rotary machine, i.e., the amplitude of the high frequency current, changes at a frequency twice as high as the frequency of the rotor position electrical angle. Such method using a high frequency voltage provides accurate estimation of rotor position even at zero velocity or a low velocity near zero velocity of the rotary machine, but on the other hand, the high frequency voltage superimposed causes torque pulsation or noise. In addition, in the method that uses a high frequency voltage, superimposition of the high frequency voltage on the voltage applied to the winding of the rotary machine and on the current flowing through the winding of the rotary machine accordingly reduces the maximum torque of the rotary machine or the rotational speed of the rotary machine.

Patent Literature 2, Patent Literature 3, and Non Patent Literature 1 each disclose a method of estimating the rotor position without applying a high frequency voltage. The methods of estimating the rotor position without applying a high frequency voltage each include subtracting the product of the inductance value along a q-axis or d-axis of the rotor and the rotary machine current from the flux linkage of the rotary machine thereby to extract a component that rotates in synchronism with the rotor position, of the flux linkage. Such component includes an active flux with respect to the d-axis and an active flux with respect to the q-axis. As used herein, the direction of the rotor that maximizes the inductance is defined as d-axis, while the direction of the rotor that minimizes the inductance is defined as q-axis. The d-axis is an axis referred to as magnetic flux axis, and the q-axis is an axis referred to as torque axis. The d-axis and the q-axis are vectorially orthogonal to each other. In Patent Literature 2, the active flux is estimated by an observer to estimate the rotor position. In Patent Literature 3, induced voltage generated by the active flux is used to estimate the rotor position. In Non Patent Literature 1, a component of the voltage of the rotary machine, generated by difference between inductance values in the d-axis and in the q-axis, is extracted as extended electromotive force, and the rotor position is estimated based on the phase thereof.

The position-sensorless control methods disclosed in Patent Literatures 2 and 3 will result in active flux having a value of zero when the rotary machine current has no d-axis component or no q-axis component, and thus fail to estimate the rotor position. Similarly, the position-sensorless control method disclosed in Non Patent Literature 1 will result in extended electromotive force having a value of zero when the rotary machine current has no d-axis component, and thus fail to estimate the rotor position. That is, the position-sensorless control methods disclosed in Patent Literatures 2 and 3 and in Non Patent Literature 1 fail to estimate the rotor position depending on the current flow direction of the rotary machine. The position-sensorless control method disclosed in Patent Literature 4 solves this problem by weighting both the active fluxes with respect to the d-axis and to the q-axis on the basis of the d-axis component and the q-axis component of the rotary machine current or of the flux linkage, and using the resultant active fluxes in the estimation of the rotor position.

CITATION LIST

Patent Literature

Patent Literature 1: Japanese Patent No. 5069306
Patent Literature 2: Japanese Patent No. 4644010
Patent Literature 3: Japanese Patent No. 3571698
Patent Literature 4: European Patent Application Laid-open No. 2493067

Non Patent Literature

Non Patent Literature 1: Shinji Ichikawa, Zhigian Chen, Mutuwo Tomita, Shinji Doki, and Shigeru Okuma. Sensorless controls of salient-pole permanent magnet synchronous motors using extended electromotive force models. "IEEJ Journal of Industry Applications". 2002, Volume 122, Issue 12, pp. 1088-1096.

SUMMARY

Technical Problem

However, the weighting operation based on the d-axis component and the q-axis component of the rotary machine current or of the flux linkage disclosed in Patent Literature 4 has an issue of complexity of control design, and of control processing as well, of rotor position estimation. Thus, the technology disclosed in Patent Literature 4 has an issue of complexity of the configuration to estimate the rotor position.

The present invention has been made in view of the foregoing, and it is an object of the present invention to provide a rotary machine control device capable of estimating the rotor position irrespective of the current flow direction of a rotary machine, with a simpler configuration.

Solution to Problem

To solve the problem and achieve the object described above, a rotary machine control device according to an aspect of the present invention is a rotary machine control device for controlling a rotary machine whose inductance has a variable component of inductance (hereinafter referred to as inductance variable component) that changes with a rotor position that is a rotational position of a rotor. The rotary machine control device includes: a current detector to detect a rotary machine current flowing through the rotary machine; and a speed estimator to compute an estimated rotational speed that is an estimated value of a rotational speed of the rotor, on a basis of motional electromotive force that is induced voltage generated due to a change in the inductance with a position of the rotor. The rotary machine control device includes: a position computing unit to compute an estimated position that is an estimated value of the rotor position, using the estimated rotational speed; and a controller to output a rotary machine voltage instruction to drive the rotary machine, on a basis of the rotary machine current and the estimated position. The rotary machine control device includes a voltage applicator to apply a voltage to the rotary machine on a basis of the rotary machine voltage instruction.

Advantageous Effects of Invention

The present invention provides an advantage in being capable of estimating the rotor position irrespective of the current flow direction of a rotary machine, with a simpler configuration.

DESCRIPTION OF EMBODIMENTS

A rotary machine control device according to embodiments of the present invention will be described in detail below with reference to the drawings. Note that these embodiments are not intended to limit the scope of this invention.

First Embodiment

Figure 1:
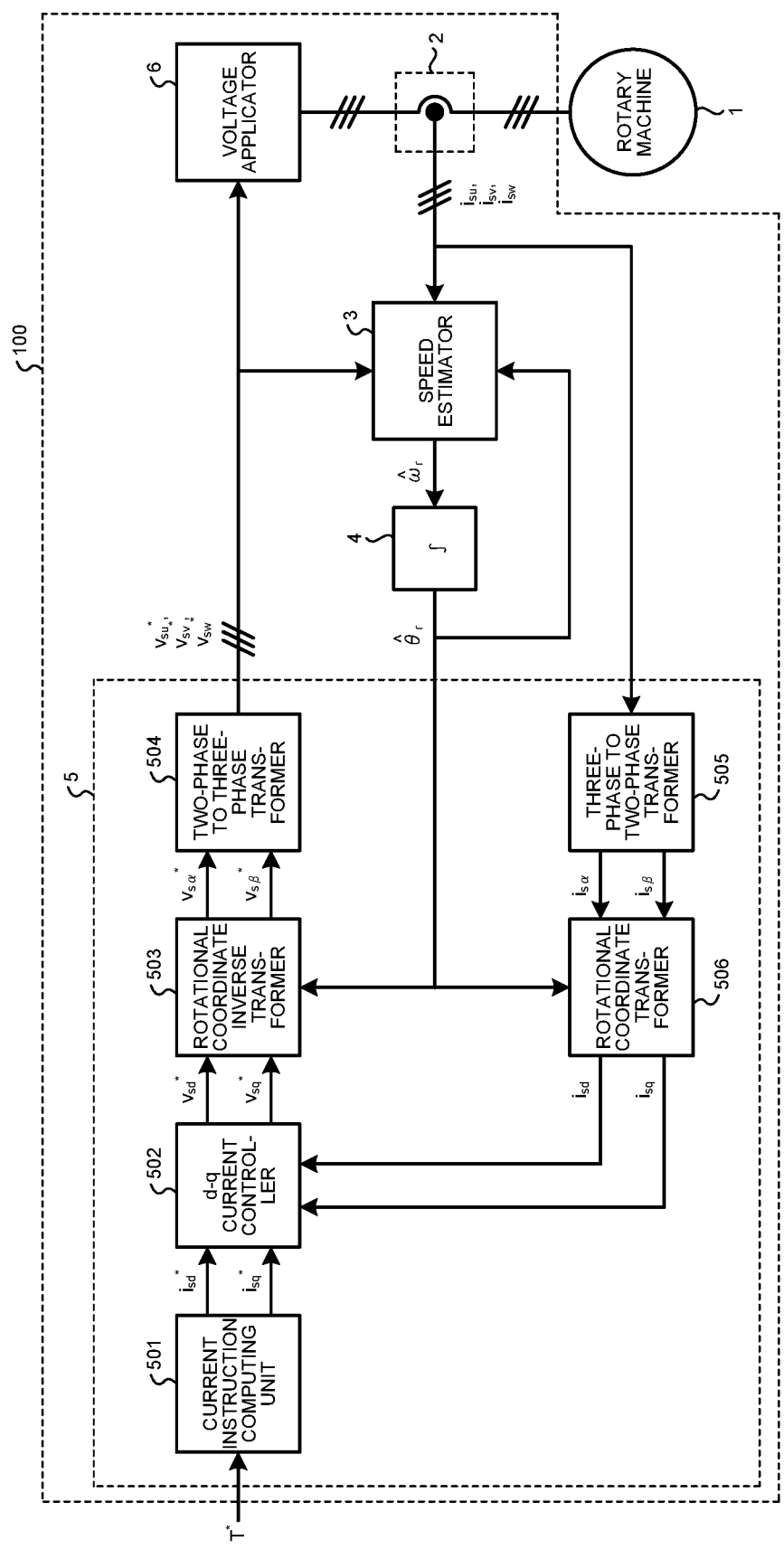
FIG. 1 is a diagram illustrating a configuration of a rotary machine control device according to a first embodiment of the present invention.

FIG. 1 is a diagram illustrating a configuration of a rotary machine control device according to a first embodiment of the present invention. A rotary machine control device 100 according to the first embodiment includes a voltage applicator 6, which applies an alternating current (AC) voltage to a rotary machine 1 according to rotary machine voltage instructions $v_{su}^*$, $v_{sv}^*$, and $v_{sw}^*$ for driving the rotary machine 1; and a current detector 2, which detects an AC current supplied from the voltage applicator 6 to the rotary machine 1, and outputs the AC current detected, as rotary machine currents $i_{su}$, $i_{sv}$, and $i_{sw}$. The rotary machine control device 100 also includes a speed estimator 3, which estimates the rotational speed of the rotor included in the rotary machine 1 using the rotary machine voltage instructions $v_{su}^*$, $v_{sv}^*$, and $v_{sw}^*$, the rotary machine currents $i_{su}$, $i_{sv}$, and $i_{sw}$, and an estimated rotor position $\hat{\theta}_r$, and outputs the rotational speed as an estimated rotational speed $\hat{\omega}_r$; a position computing unit 4, which computes the estimated rotor position $\hat{\theta}_r$ using the estimated rotational speed $\hat{\omega}_r$; and a controller 5. The estimated rotational speed $\hat{\theta}_r$ is an estimated value of the rotational speed of the rotor (not shown) included in the rotary machine 1. The estimated rotor position $\hat{\theta}_r$ is an estimated value of the rotor position, which is the rotational position of the rotor. The estimated rotor position $\hat{\theta}_r$ is represented by an electrical angle. The rotary machine 1, controlled by the rotary machine control device 100, is a synchronous reluctance motor. A synchronous reluctance motor is a motor whose inductance has an inductance variable component that changes with the rotor position. The rotary machine 1 may hereinafter be referred to simply as "rotary machine". The voltage applicator 6 is connected to the rotary machine via three lines of U, V, and W. The current detector 2 detects an AC current flowing into these lines. Hereinafter, the direction of the rotor that maximizes the inductance is referred to as d-axis, and the direction of the rotor that minimizes the inductance is referred to as q-axis.

The controller 5 includes a current instruction computing unit 501, a d-q current controller 502, a rotational coordinate inverse transformer 503, a two-phase to three-phase transformer 504, a three-phase to two-phase transformer 505, and a rotational coordinate transformer 506 thus to compute the rotary machine voltage instructions $v_{su}^*$, $v_{sv}^*$, and $v_{sw}^*$ for causing the rotary machine to generate an output corresponding to a torque instruction value T*.

The current instruction computing unit 501 computes current instructions $i_{sd}^*$ and $i_{sq}^*$ represented in a rotating reference frame required for the rotary machine to generate an output corresponding to the torque instruction value T*. In this respect, the current instructions $i_{sd}^*$ and $i_{sq}^*$ represented in the two-phase rotating reference frame are selected to minimize the root means square (RMS) current value for the torque, i.e., the copper loss of the rotary machine.

The d-q current controller 502 provides control to derive the current instructions $i_{sd}^*$ and $i_{sq}^*$ from d- and q-axis currents $i_{sd}$ and $i_{sq}$ generated by rotational coordinate transformation of the rotational coordinate transformer 506, and computes rotary machine voltage instructions $v_{sd}^*$ and $v_{sq}^*$ represented in the two-phase rotating reference frame. This current control is provided using, for example, proportional integral (PI) control or the like.

The rotational coordinate inverse transformer 503 performs, as shown in Formula (1) below, rotational coordinate inverse transformation from the rotary machine voltage instructions $v_{sd}^*$ and $v_{sq}^*$ represented in the two-phase rotating reference frame to rotary machine voltage instructions $v_{s\alpha}^*$ and $v_{s\beta}^*$ represented in a two-phase reference frame, using the estimated rotor position $\hat{\theta}_r$ computed by the position computing unit 4. In the first embodiment, the rotational coordinate inverse transformation is performed using a transformation matrix $C_{dq}^{-1}(\hat{\theta}_r)$ of Formula (1) below.

[Formula 1]

$$\begin{bmatrix} v_{s\alpha}^* \\ v_{s\beta}^* \end{bmatrix} = \underbrace{\begin{bmatrix} \cos\hat{\theta}_r & -\sin\hat{\theta}_r \\ \sin\hat{\theta}_r & \cos\hat{\theta}_r \end{bmatrix}}_{C_{dq}^{-1}(\hat{\theta}_r)} \begin{bmatrix} v_{sd}^* \\ v_{sq}^* \end{bmatrix} \quad (1)$$

The two-phase to three-phase transformer 504 transforms, as shown in Formula (2) below, the rotary machine voltage instructions $v_{s\alpha}^*$ and $v_{s\beta}^*$ represented in the two-phase rest frame to the rotary machine voltage instructions $v_{su}^*$, $v_{sv}^*$, and $v_{sw}^*$ represented in a three-phase reference frame. In the first embodiment, the two-phase to three-phase transformation is performed using a transformation matrix $C_{23}$ of Formula (2) below.

[Formula 2]

$$\begin{bmatrix} v_{su}^* \\ v_{sv}^* \\ v_{sw}^* \end{bmatrix} = \sqrt{\frac{2}{3}} \underbrace{\begin{bmatrix} 1 & 0 \\ -\frac{1}{2} & \frac{\sqrt{3}}{2} \\ -\frac{1}{2} & -\frac{\sqrt{3}}{2} \end{bmatrix}}_{C_{23}} \begin{bmatrix} v_{s\alpha}^* \\ v_{s\beta}^* \end{bmatrix} \quad (2)$$

The three-phase to two-phase transformer 505 performs, as shown in Formula (3) below, three-phase to two-phase transformation from the rotary machine currents $i_{su}$, $i_{sv}$, and $i_{sw}$ represented in the three-phase reference frame to rotary machine currents $i_{s\alpha}$ and $i_{s\beta}$ represented in the two-phase rest frame. In the first embodiment, the three-phase to two-phase transformation is performed using a transformation matrix $C_{32}$ of Formula (3) below.

[Formula 3]

$$\begin{bmatrix} i_{s\alpha} \\ i_{s\beta} \end{bmatrix} = \sqrt{\frac{2}{3}} \underbrace{\begin{bmatrix} 1 & -\frac{1}{2} & -\frac{1}{2} \\ 0 & \frac{\sqrt{3}}{2} & -\frac{\sqrt{3}}{2} \end{bmatrix}}_{C_{32}} \begin{bmatrix} i_{su} \\ i_{sv} \\ i_{sw} \end{bmatrix} \quad (3)$$

The rotational coordinate transformer 506 performs, as shown in Formula (4) below, rotational coordinate transformation from the rotary machine currents $i_{s\alpha}$ and $i_{s\beta}$ represented in the two-phase rest frame to the d- and q-axis currents $i_{sd}$ and $i_{sq}$ represented in the two-phase rotating reference frame, using the estimated rotor position $\hat{\theta}_r$. In the first embodiment, the rotational coordinate transformation is performed using a transformation matrix $C_{dq}$ of Formula (4) below.

[Formula 4]

$$\begin{bmatrix} i_{sd} \\ i_{sq} \end{bmatrix} = \underbrace{\begin{bmatrix} \cos\hat{\theta}_r & \sin\hat{\theta}_r \\ -\sin\hat{\theta}_r & \cos\hat{\theta}_r \end{bmatrix}}_{C_{dq}(\hat{\theta}_r)} \begin{bmatrix} i_{s\alpha} \\ i_{s\beta} \end{bmatrix} \quad (4)$$

Figure 2:
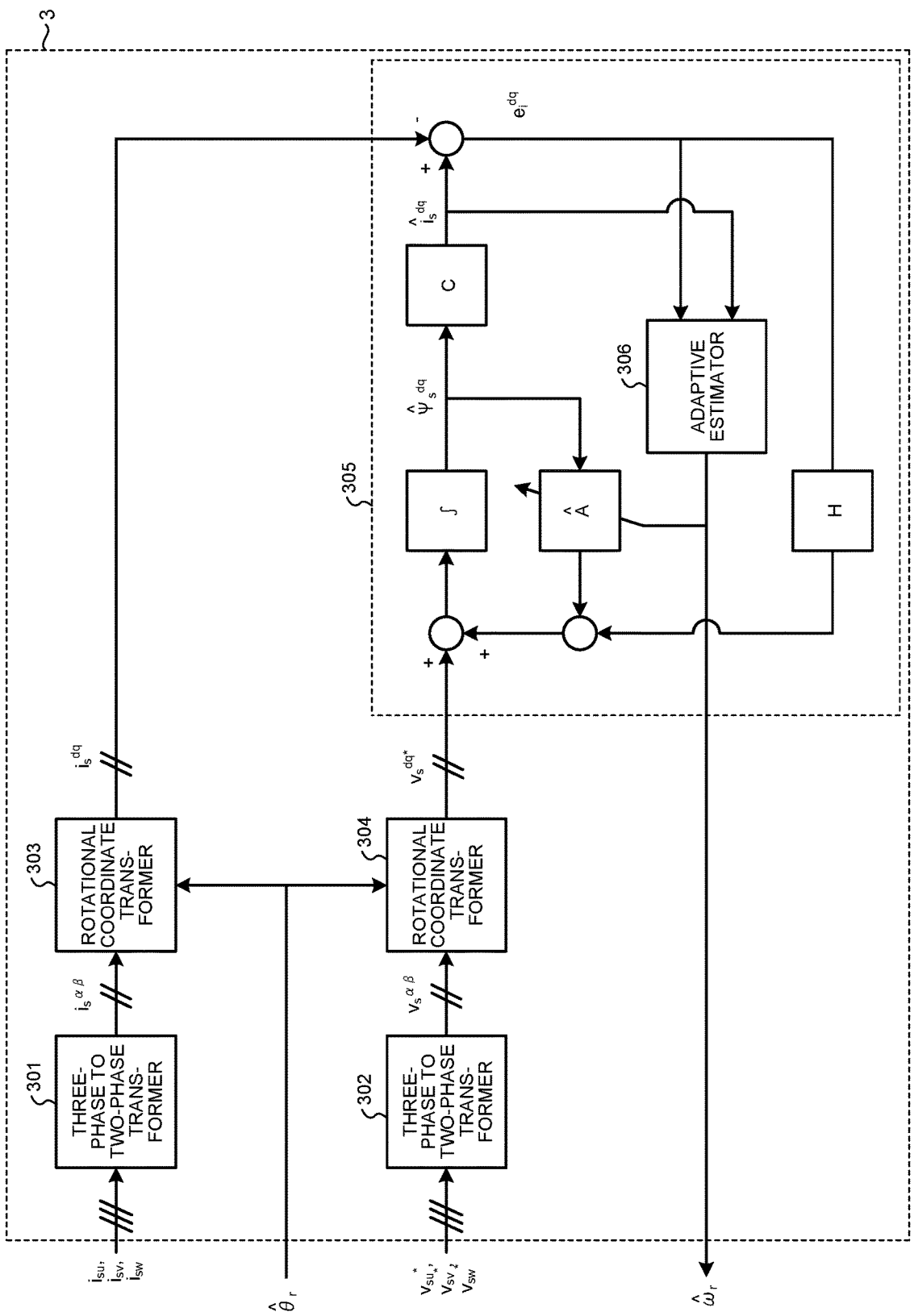
FIG. 2 is a diagram illustrating a configuration of a speed estimator illustrated in FIG. 1.

FIG. 2 is a diagram illustrating a configuration of the speed estimator illustrated in FIG. 1. As illustrated in FIG. 2, the speed estimator 3 includes a three-phase to two-phase transformer 301, a three-phase to two-phase transformer 302, a rotational coordinate transformer 303, a rotational coordinate transformer 304, an adaptive observer 305, and an adaptive estimator 306.

The three-phase to two-phase transformer 301 transforms the rotary machine currents $i_{su}$, $i_{sv}$, and $i_{sw}$ represented in the three-phase reference frame to the rotary machine currents $i_{s\alpha}$ and $i_{s\beta}$ represented in the two-phase rest frame. In FIG. 2, the rotary machine currents $i_{s\alpha}$ and $i_{s\beta}$ are indicated as $i_s^{\alpha\beta}$. In addition, the rotational coordinate transformer 303 performs rotational coordinate transformation from the rotary machine current $i_s^{\alpha\beta}$ represented in the two-phase rest frame to the d- and q-axis currents $i_{sd}$ and $i_{sd}$ represented in the two-phase rotating reference frame, using the estimated rotor position $\hat{\theta}_r$. In FIG. 2, the d- and q-axis currents $i_{sd}$ and $i_{sq}$ are indicated as $i_s^{dq}$.

Meanwhile, the three-phase to two-phase transformer 302 transforms the rotary machine voltage instructions $v_{su}^*$, $v_{sv}^*$, and $v_{sw}^*$ represented in the three-phase reference frame to the rotary machine voltage instructions $v_{s\alpha}^*$ and $v_{s\beta}^*$ represented in the two-phase reference frame. In FIG. 2, the rotary machine voltage instructions $v_{s\alpha}^*$ and $v_{s\beta}^*$ are indicated as $v_s^{\alpha\beta*}$. In addition, the rotational coordinate transformer 304 performs rotational coordinate transformation from the rotary machine voltage instructions $v_{s\alpha}^*$ and $v_{s\beta}^*$ represented in the two-phase rest frame to the rotary machine voltage instruction $v_s^{dq*}$ represented in the two-phase rotating reference frame.

Then, the adaptive observer 305 computes the estimated rotational speed $\hat{\omega}_r$ of the rotor using the rotary machine current $i_s^{dq}$ and the rotary machine voltage instruction $v_s^{dq*}$ represented in the two-phase rotating reference frame. An operation of the adaptive observer 305 will now be described in detail. First, a model of the rotary machine can be expressed by Formulae (5), (6), and (7) below in the two-phase rest frame. $R_s$ of Formula (5) below is the winding resistance. $\Psi_s^{\alpha\beta}$ of Formula (5) below is the flux linkage of the rotary machine. $L_s^{\alpha\beta}$ of Formula (6) below is the inductance of the rotary machine.

[Formula 5]

$$v_s^{\alpha\beta} = R_s i_s^{\alpha\beta} + \frac{d}{dt}\psi_s^{\alpha\beta} \tag{5}$$

[Formula 6]

$$\psi_s^{\alpha\beta} = L_s^{\alpha\beta} i_s^{\alpha\beta} \tag{6}$$

[Formula 7]

$$L_s^{\alpha\beta} = \begin{bmatrix} L_{sdc} + L_{mac}\cos(2\theta_r) & L_{mac}\sin(2\theta_r) \\ L_{mac}\sin(2\theta_r) & L_{sdc} - L_{mac}\cos(2\theta_r) \end{bmatrix} \tag{7}$$

$L_{sdc}$ of Formula (7) above represents the average component of inductance (hereinafter referred to as inductance average component) that does not change with the rotor position, and $L_{mac}$ represents the inductance variable component that changes with the rotor position. In addition, a change in the inductance is generally represented by a sine or cosine function of $2\theta_r$, where $\theta_r$ represents the electrical angle of the rotor position. Moreover, as shown by the second term of Formula (5) above, the voltage to appear due to a change in the flux linkage is referred to as induced voltage. Rotational coordinate transformation of the model of Formulae (5), (6), and (7) above at a control coordinate angle $\theta_s$ yields the model of Formulae (8), (9), and (10) below.

[Formula 8]

$$v_s^{dq} = R_s i_s^{dq} + \frac{d}{dt}\psi_s^{dq} + \omega_s J \psi_s^{dq} \tag{8}$$

[Formula 9]

$$\psi_s^{dq} = L_s^{dq} i_s^{dq} \tag{9}$$

[Formula 10]

$$L_s^{dq} = \begin{bmatrix} L_{sdc} + L_{mac}\cos(2(\theta_r - \theta_s)) & L_{mac}\sin(2(\theta_r - \theta_s)) \\ L_{mac}\sin(2(\theta_r - \theta_s)) & L_{sdc} - L_{mac}\cos(2(\theta_r - \theta_s)) \end{bmatrix} \tag{10}$$

J of Formula (8) above represents the transformation matrix shown in Formula (11) below.

[Formula 11]

$$J = \begin{bmatrix} 0 & -1 \\ 1 & 0 \end{bmatrix} \tag{11}$$

In the two-phase rotating reference frame, the second term and the third term of Formula (8) above together represent the induced voltage.

Expanding the model of Formulae (8), (9), and (10) above into equations of voltage and current yields Formulae (12) and (13) below.

[Formula 12]

$$v_s^{dq} = R_s i_s^{dq} + L_s^{dq}\frac{di_s^{dq}}{dt} + \frac{dL_s^{dq}}{dt}i_s^{dq} + \omega_s J L_s^{dq} i_s^{dq} \tag{12}$$

[Formula 13]

$$v_s^{dq} = R_s i_s^{dq} + \tag{13}$$
$$\begin{bmatrix} L_{sdc} + L_{mac}\cos(2(\theta_r - \theta_s)) & L_{mac}\sin(2(\theta_r - \theta_s)) \\ L_{mac}\sin(2(\theta_r - \theta_s)) & L_{sdc} - L_{mac}\cos(2(\theta_r - \theta_s)) \end{bmatrix}\frac{d}{dt}i_s^{dq} +$$
$$2(\omega_r - \omega_s)\begin{bmatrix} -L_{mac}\sin(2(\theta_r - \theta_s)) & L_{mac}\cos(2(\theta_r - \theta_s)) \\ L_{mac}\cos(2(\theta_r - \theta_s)) & L_{mac}\sin(2(\theta_r - \theta_s)) \end{bmatrix}i_s^{dq} +$$
$$\omega_s\begin{bmatrix} -L_{mac}\sin(2(\theta_r - \theta_s)) & -(L_{sdc} - L_{mac}\cos(2(\theta_r - \theta_s))) \\ L_{sdc} + L_{mac}\cos(2(\theta_r - \theta_s)) & L_{mac}\sin(2(\theta_r - \theta_s)) \end{bmatrix}i_s^{dq}$$

Note that $\omega_r$ of Formula (13) above is the rotor angular velocity expressed by Formula (14) below. The value $\omega_s$ of Formulae (12) and (13) above is the angular velocity at which the control reference frame rotates, expressed by Formula (15) below. The control reference frame provides rotational coordinates.

[Formula 14]

$$\omega_r = \frac{d}{dt}\theta_r \tag{14}$$

[Formula 15]

$$\omega_s = \frac{d}{dt}\theta_s \tag{15}$$

In this regard, the third terms of Formulae (12) and (13) above each represent induced voltage. This induced voltage is generated due to a change in the inductance with the rotor position. In the first embodiment, this induced voltage is referred to as motional electromotive force. This motional electromotive force includes induced voltage proportional to the rotational speed. By assigning $\theta_r = \theta_s$ in the model of Formulae (12) and (13) above, the model of Formula (16) below is obtained.

[Formula 16]

$$v_s^{dq} = R_s i_s^{dq} + \begin{bmatrix} L_{sdc} + L_{mac} & 0 \\ 0 & L_{sdc} - L_{mac} \end{bmatrix}\frac{d}{dt}i_s^{dq} + \tag{16}$$
$$2(\omega_r - \omega_s)\begin{bmatrix} 0 & L_{mac} \\ L_{mac} & 0 \end{bmatrix}i_s^{dq} + \omega_s\begin{bmatrix} 0 & -(L_{sdc} - L_{mac}) \\ L_{sdc} + L_{mac} & 0 \end{bmatrix}i_s^{dq}$$

Using d-axis inductance $L_{sd}$ ($L_{sd} = L_{sdc} + L_{mac}$) and q-axis inductance $L_{sq}$ ($L_{sq} = L_{sdc} - L_{mac}$) of the rotary machine, the model of Formula (16) above yields the model of Formula (17) below.

[Formula 17]

$$v_s^{dq} = R_s i_s^{dq} + \begin{bmatrix} L_{sd} & 0 \\ 0 & L_{sq} \end{bmatrix}\frac{d}{dt}i_s^{dq} + \tag{17}$$
$$2(\omega_r - \omega_s)\begin{bmatrix} 0 & L_{mac} \\ L_{mac} & 0 \end{bmatrix}i_s^{dq} + \omega_s\begin{bmatrix} 0 & -L_{sq} \\ L_{sd} & 0 \end{bmatrix}i_s^{dq}$$

The second terms of Formulae (16) and (17) above each represent induced voltage generated corresponding to the product of an inductance value and a derivative value of the current represented in the two-phase rotating reference frame. In addition, the third terms of Formulae (16) and (17) above each represent induced voltage generated corresponding to the product of a derivative value of the inductance and a current value. Moreover, the fourth terms of Formulae (16) and (17) above each represent induced voltage generated corresponding to the product of an inductance value and a current value in the two-phase rotating reference frame. Note that the third terms of Formulae (16) and (17) above each represent motional electromotive force generated due to a change in the inductance with the rotor position. This motional electromotive force includes induced voltage having a value formed of the product of the rotational speed, the inductance variable component, and the current value of the corresponding phase, and this induced voltage is proportional to the rotational speed. Moreover, a model that assumes a relationship of $\omega_r = \omega_s$ will not have this motional electromotive force. Formula (16) above can be expressed as Formula (19) below using flux linkage $\Psi_s^{dq}$ represented in the rotating reference frame shown in Formula (18) below.

[Formula 18]

$$\psi_s^{dq} = \begin{bmatrix} L_{sdc} + L_{mac} & 0 \\ 0 & L_{sdc} - L_{mac} \end{bmatrix} i_s^{dq} \qquad (18)$$

[Formula 19]

$$\frac{d}{dt}\psi_s^{dq} = -R_s \begin{bmatrix} \frac{1}{L_{sdc} + L_{mac}} & 0 \\ 0 & \frac{1}{L_{sdc} - L_{mac}} \end{bmatrix} \psi_s^{dq} - \qquad (19)$$

$$2(\omega_r - \omega_s)\begin{bmatrix} 0 & \frac{L_{mac}}{L_{sdc} - L_{mac}} \\ \frac{L_{mac}}{L_{sdc} + L_{mac}} & 0 \end{bmatrix}\psi_s^{dq} - \omega_s J \psi_s^{dq} + v_s^{dq}$$

Formula (19) above can further be rewritten as a model of the rotary machine expressed using the d-axis inductance $L_{sd}$ and the q-axis inductance $L_{sq}$ as Formulae (20) and (21) below.

[Formula 20]

$$\frac{d}{dt}\psi_s^{dq} = \qquad (20)$$

$$\underbrace{-R_s \begin{bmatrix} \frac{1}{L_{sd}} & 0 \\ 0 & \frac{1}{L_{sq}} \end{bmatrix}\psi_s^{dq} - 2(\omega_r - \omega_s)\begin{bmatrix} 0 & \frac{L_{mac}}{L_{sq}} \\ \frac{L_{mac}}{L_{sd}} & 0 \end{bmatrix}\psi_s^{dq} - \omega_s J \psi_s^{dq} + v_s^{dq}}_{A\psi_s^{dq}}$$

[Formula 21]

$$\psi_s^{dq} = \underbrace{\begin{bmatrix} L_{sd} & 0 \\ 0 & L_{sq} \end{bmatrix}}_{C^{-1}} i_s^{dq} \qquad (21)$$

The second terms of Formulae (19) and (20) above each represent motional electromotive force, and include induced voltage proportional to the rotational speed. To estimate the rotational speed, the observer is first configured as expressed by Formula (22) below. The designation $\hat{i}_s^{dq}$ of Formula (22) below represents an estimated value of the rotary machine current represented in the two-phase rotating reference frame. The designation $\hat{\Psi}_s^{dq}$ of Formula (22) below represents an estimated value of the flux linkage represented in the two-phase rotating reference frame.

[Formula 22]

$$\frac{d}{dt}\hat{\psi}_s^{dq} = \qquad (22)$$

$$\underbrace{-R_s \begin{bmatrix} \frac{1}{L_{sd}} & 0 \\ 0 & \frac{1}{L_{sq}} \end{bmatrix}\hat{\psi}_s^{dq} - 2(\hat{\omega}_r - \omega_s)\begin{bmatrix} 0 & \frac{L_{mac}}{L_{sq}} \\ \frac{L_{mac}}{L_{sd}} & 0 \end{bmatrix}\hat{\psi}_s^{dq} - \omega_s J \hat{\psi}_s^{dq} +}_{\hat{A}\hat{\psi}_s^{dq}}$$

$$v_s^{dq} - H(\hat{i}_s^{dq} - i_s^{dq})$$

At this point, as shown in Formula (23) below, appropriate designing of an observer gain H allows the estimated flux linkage $\hat{\Psi}_s^{dq}$ of the observer to converge at a response webs, which is a true value. Note that the design of the observer gain H is not limited to the example of Formula (23) below.

[Formula 23]

$$H = \begin{bmatrix} R_s + \omega_{cobs}L_{sd} & -2L_{mac}(\hat{\omega}_r - \omega_s) + \omega_s L_{sq} \\ -2L_{mac}(\omega_r - \omega_s) - \omega_s L_{sd} & R_s + \omega_{cobs}L_{sq} \end{bmatrix} \qquad (23)$$

In the observer, an estimated rotational speed $\hat{\omega}_r$ having an error will cause the estimated flux linkage $\hat{\Psi}_s^{dq}$ to include an error. The adaptive estimator 306 computes the rotational speed from an estimation error of the flux linkage in association with the motional electromotive force corresponding to the estimation error of the rotational speed.

Figure 3:
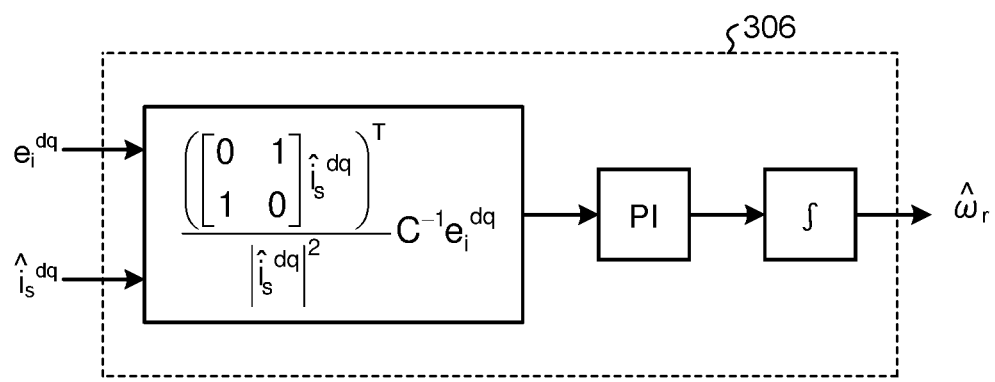
FIG. 3 is a diagram illustrating a configuration of an adaptive estimator illustrated in FIG. 2.

FIG. 3 is a diagram illustrating a configuration of the adaptive estimator illustrated in FIG. 2. As illustrated in FIG. 3, the adaptive estimator 306 computes the estimated rotational speed $\hat{\omega}_r$ of the rotor using an adaptive law of Formulae (24) and (25) below.

[Formula 24]

$$\hat{\omega}_r = \frac{1}{s}k_{ap}\left(1 + \frac{\omega_{ai}}{s}\right)\frac{\left(\begin{bmatrix} 0 & 1 \\ 1 & 0 \end{bmatrix}\hat{i}_s^{dq}\right)^T}{|\hat{i}_s^{dq}|^2}(\hat{\psi}_s^{dq} - \psi_s^{dq}) \qquad (24)$$

[Formula 25]

$$\hat{\omega}_r = \frac{1}{s}k_{ap}\left(1 + \frac{\omega_{ai}}{s}\right)\frac{\left(\begin{bmatrix} 0 & 1 \\ 1 & 0 \end{bmatrix}\hat{i}_s^{dq}\right)^T}{|\hat{i}_s^{dq}|^2}C^{-1}\underbrace{(\hat{i}_s^{dq} - i_s^{dq})}_{e_i^{dq}} \qquad (25)$$

In this regard, assuming that $k_{ap}$ of Formulae (24) and (25) above has a value calculated using Formula (26) below, and that $\omega_{ai}$ of Formulae (24) and (25) above has a value calculated using Formula (27) below, the estimated response of the rotor position will be $\omega_{ca}$.

[Formula 26]

$$k_{ap} = \frac{\omega_{ca}\omega_{cobs}}{2L_{mac}} \quad (26)$$

[Formula 27]

$$\omega_{ai} = \frac{\omega_{ca}}{5} \quad (27)$$

In addition, the adaptive estimator 306 extracts an estimation error of the rotational speed from an estimation error of the flux linkage or of the rotary machine current, on the basis of a value $e_{\omega 1}$ shown by Formula (28) below, i.e., a value included in Formula (24) above, or on the basis of a value $e_{\omega 2}$ shown by Formula (29) below, i.e., a value included in Formula (25) above. The factor "$\psi_s^{dq} - \psi_s^{dq}$" of Formula (28) below represents the estimation error of the flux linkage. The factor "$\hat{i}_s^{dq} - i_s^{dq}$" of Formula (29) below represents the estimation error of the rotary machine current.

[Formula 28]

$$e_{\omega 1} = \left(\begin{bmatrix} 0 & 1 \\ 1 & 0 \end{bmatrix} i_s^{dq}\right)^T (\hat{\psi}_s^{dq} - \psi_s^{dq}) \quad (28)$$

[Formula 29]

$$e_{\omega 2} = \left(\begin{bmatrix} 0 & 1 \\ 1 & 0 \end{bmatrix} i_s^{dq}\right)^T C^{-1} \underbrace{(\hat{i}_s^{dq} - i_s^{dq})}_{e_i^{dq}} \quad (29)$$

Note that the selection of the adaptive law to estimate the rotational speed is not limited to the foregoing method, but, for example, can be determined using Reference 1 given below.
(Reference 1) loan D. Landau and Masayoshi Tomizuka, Tekio Seigyo System no Riron to Jissai (English equivalence, Theory and Practice of Adaptive Control Systems), Ohmsha, Ltd., 1981

Next, an advantage of the method of estimating the rotor position according to the first embodiment will be described in comparison with the conventional methods of estimating the rotor position.

The technology disclosed in Patent Literature 2 described above subtracts the product of the q-axis inductance $L_{sq}$ of the rotor and the rotary machine current $i_s^{\alpha\beta}$ from the flux linkage $\Psi_s^{\alpha\beta}$ of the rotary machine as shown in Formula (30) below, and thus extracts an active flux with respect to the d-axis ($\Psi_{AFd}^{\alpha\beta}$), which is the component that rotates in synchronism with the rotor position, of the flux linkage.

[Formula 30]

$$\Psi_{AFd}^{\alpha\beta} = \Psi_s^{\alpha\beta} - L_{sq} i_s^{\alpha\beta} \quad (30)$$

In addition, the rotary machine current $i_s^{\alpha\beta}$ can be expressed as Formula (31) below.

[Formula 31]

$$i_s^{\alpha\beta} = \sqrt{3} I_{ph} \begin{bmatrix} \cos(\theta_r + \varphi_i) \\ \sin(\theta_r + \varphi_i) \end{bmatrix} \quad (31)$$

$I_{ph}$ of Formula (31) above is an RMS current value, and $\varphi_i$ is a current flow angle, i.e., the angular difference between the actual rotor position and the rotary machine current.

Substitution of Formula (6) above and Formula (7) above for the right side of Formula (30) above yields Formula (32) below for the active flux with respect to the d-axis ($\Psi_{AFd}^{\alpha\beta}$).

[Formula 32]

$$\psi_{AFd}^{\alpha\beta} = 2L_{mac}\sqrt{3}\,I_{ph}\cos\phi_i \underbrace{\phantom{X}}_{(L_{sd}-L_{sq})i_{sd}}\begin{bmatrix} \cos\theta_r \\ \sin\theta_r \end{bmatrix} \quad (32)$$

The active flux of Formula (32) above is in the rotor d-axis direction, and thus estimation of this using an observer or the like enables the rotor position to be estimated. The technology disclosed in Patent Literature 3 described above estimates the rotor position using the induced voltage generated due to the active flux with respect to the d-axis. By using the active flux, i.e., using Formulae (5), (30), and (32) above, a model of the rotary machine can be expressed in a two-phase rotating reference frame that rotates in synchronism with the rotor position ($\theta_r = \theta_s$ and $\omega_r = \omega_s$) as Formula (33) below.

[Formula 33]

$$v_s^{dq} = R_s i_s^{dq} + \begin{bmatrix} L_{sq} & 0 \\ 0 & L_{sq} \end{bmatrix} \frac{d}{dt} i_s^{dq} + \omega_r J \begin{bmatrix} L_{sq} & 0 \\ 0 & L_{sq} \end{bmatrix} i_s^{dq} + \omega_r \underbrace{(L_{sd} - L_{sq}) i_{sd}}_{|\psi_{AFd}^{\alpha\beta}|} \begin{bmatrix} 0 \\ 1 \end{bmatrix} \quad (33)$$

The induced voltage represented by the second term and the induced voltage represented by the third term of Formula (33) above do not use the inductance values of the respective phases, but commonly use the q-axis inductance value. Therefore, the induced voltage given by the remained fourth term is the induced voltage caused by the active flux, and can thus be used in the rotor position estimation. In addition, the model of Formula (33) above assumes the relationship of $\omega_r = \omega_s$, which causes no motional electromotive force generated due to a change in the inductance with the rotor position. When the model of Formula (33) above is actually used, the value $\omega_s$ is used for $\omega_r$, in which case a change in the true rotational speed $\omega_r$ does not affect this model.

Moreover, Patent Literature 2 also describes an active flux with respect to the q-axis as shown in Formula (34) below, obtained by subtraction of the product of the d-axis inductance of the rotor and the rotary machine current from the flux linkage of the rotary machine.

[Formula 34]

$$\Psi_{AFq}^{\alpha\beta} = \Psi_s^{\alpha\beta} - L_{sd} i_s^{\alpha\beta} \quad (34)$$

Similarly to the case of the d-axis reference, substitution of Formula (6) above, Formula (7) above, and Formula (31) above for the right side of Formula (34) above yields Formula (35) below for the active flux with respect to the q-axis ($\Psi_{AFq}^{\alpha\beta}$).

[Formula 35]

$$\psi_{AFq}^{\alpha\beta} = \underbrace{-2L_{mac}\sqrt{3}\, I_{ph}\sin\phi_i}_{(L_{sq}-L_{sd})i_{sq}}\begin{bmatrix}-\sin\theta_r\\ \cos\theta_r\end{bmatrix} \quad (35)$$

The active flux with respect to the q-axis is in the rotor q-axis direction, and thus estimation of this using an observer or the like enables the rotor position to be estimated. However, similarly to the case of the model using the active flux with respect to the d-axis, the motional electromotive force generated due to a change in the inductance with the rotor position is not usable. The technology of Patent Literature 4 weights both the active fluxes with respect to the d-axis and to the q-axis on the basis of the d-axis component and the q-axis component of the rotary machine current or the flux linkage, and uses the resultant active fluxes in the estimation of the rotor position. Meanwhile, the technology of Non Patent Literature 1 described above extracts the component generated by difference between inductance values in the d-axis and in the q-axis of the voltage of the rotary machine, as extended electromotive force, and the rotor position is estimated using this. To extract the extended electromotive force, the model of Formula (17) above is first expressed as Formula (36) below using the relationship of $\omega_r=\omega_s$.

[Formula 36]

$$v_s^{dq} = R_s i_s^{dq} + \begin{bmatrix}L_{sd} & 0\\ 0 & L_{sq}\end{bmatrix}\frac{d}{dt}i_s^{dq} + \omega_r\begin{bmatrix}0 & -L_{sq}\\ L_{sd} & 0\end{bmatrix}i_s^{dq} \quad (36)$$

In Formula (36) above, when the inductance value of $L_{sd}$ is commonly used in the second term and the inductance value of $L_{sq}$ is commonly used in the third term, Formula (36) above can be rewritten as Formula (37) below.

[Formula 37]

$$v_s^{dq} = R_s i_s^{dq} + \begin{bmatrix}L_{sd} & 0\\ 0 & L_{sd}\end{bmatrix}\frac{d}{dt}i_s^{dq} + \omega_r\begin{bmatrix}0 & -L_{sq}\\ L_{sq} & 0\end{bmatrix}i_s^{dq} + \underbrace{(L_{sd}-L_{sq})\left(\omega_r i_{sd} - \frac{d}{dt}i_{sq}\right)\begin{bmatrix}0\\ 1\end{bmatrix}}_{e_{ext}^{dq}} \quad (37)$$

The fourth term "$e_{ext}^{dq}$" of Formula (37) above represents the extended electromotive force. That is, the operation for induced voltage in the second term of Formula (37) above commonly uses $L_{sd}$, and the operation for induced voltage in the third term of Formula (37) above commonly uses $L_{sq}$, thereby leaving the induced voltage of the fourth term of Formula (37) above to express the extended electromotive force. Moreover, the model of Formula (37) above assumes the relationship of $\omega_r=\omega_s$, which causes no motional electromotive force generated due to a change in the inductance with the rotor position. Transformation of Formula (37) above through rotational coordinate inverse transformation to the two-phase rest frame yields Formula (38) below.

[Formula 38]

$$v_s^{\alpha\beta} = R_s i_s^{\alpha\beta} + \begin{bmatrix}L_{sd} & 0\\ 0 & L_{sd}\end{bmatrix}\frac{d}{dt}i_s^{\alpha\beta} + \omega_r\begin{bmatrix}0 & L_{sd}-L_{sq}\\ -(L_{sd}-L_{sq}) & 0\end{bmatrix}i_s^{\alpha\beta} + \underbrace{(L_{sd}-L_{sq})\left(\omega_r i_{sd} - \frac{d}{dt}i_{sq}\right)\begin{bmatrix}-\sin\theta_r\\ \cos\theta_r\end{bmatrix}}_{e_{ext}^{\alpha\beta}} \quad (38)$$

The fourth term "$e_{ext}^{\alpha\beta}$" of Formula (38) above represents the extended electromotive force represented in the two-phase rest frame. Considering that $di_{sq}/dt$ is zero in a stationary state, it can be confirmed, from Formulae (37) and (38) above, that the extended electromotive force is a voltage generated in the q-axis direction by flux linkage in the d-axis direction $(L_{sd}-L_{sq})i_d$. When the model of Formulae (37) and (38) above is actually used, the value $\omega_s$ is used for $\omega_r$, in which case a change in the true rotational speed $\omega_r$ does not affect this model.

As described above, the conventional technologies estimate the rotor position using active flux or extended electromotive force. However, active flux with respect to the d-axis and extended electromotive force will have a value of zero when the current flow direction is only the rotor q-axis direction, that is, when $i_{sd}=0$. Thus, these cannot be used in position estimation. Similarly, active flux with respect to the q-axis will have a value of zero when the current flow direction is only the rotor d-axis direction, that is, when $i_{sq}=0$. Thus, this cannot be used in position estimation. The technology of Patent Literature 4 described above solves these problems by weighting both the active fluxes with respect to the d-axis and to the q-axis on the basis of the d-axis component and the q-axis component of the rotary machine current or of the flux linkage, and using the resultant active fluxes in the estimation of the rotor position. However, the weighting operation based on the d-axis component and the q-axis component of the rotary machine current or of the flux linkage involves complexity of control design, and of control processing as well, of rotor position estimation. In addition, the conventional rotor position estimation methods using active flux or extended electromotive force each assume that the angular velocity $\omega_s$ at which the control reference frame rotates is equal to the rotational speed $\omega_r$ in the model of the rotary machine. Thus, performing rotational coordinate transformation of $\omega_s$ does not generate induced voltage in association with $\omega_r$. In other words, the models of the conventional methods do not generate motional electromotive force including induced voltage generated due to a change in the inductance with the rotor position and having an amount proportional to the rotational speed.

The rotary machine control device 100 according to the first embodiment estimates the rotational speed and the rotor position using motional electromotive force that is induced voltage generated due to a change in the inductance with the rotor position such as ones represented by the third terms of Formulae (12) and (13) above or the third term of each of Formulae (16) and (17) above, and the second term of each of Formulae (19) and (20) above. These examples of motional electromotive force each have both components of the two respective phases in the two-phase rotating reference frame. Therefore, position estimation is possible irrespective of the current flow direction, by using the motional electromotive force. In addition, the rotary machine control device 100 according to the first embodiment does not need to perform weighting depending on the current flow direction.

Accordingly, the rotary machine control device 100 according to the first embodiment provides an unprecedented significant advantage in being capable of estimating the rotor position irrespective of the current flow direction of the rotary machine, with a simpler configuration.

In addition, the conventional technologies estimate the rotor position from active flux or extended electromotive force. The rotary machine control device 100 according to the first embodiment estimates the rotational speed of the rotor from motional electromotive force. Since the rotational speed is the derivative of rotor position, estimation of a rotational speed enables the rotor position to be estimated with higher responsivity. Accordingly, the rotary machine control device 100 according to the first embodiment provides an unprecedented, highly significant advantage in being capable of estimating the rotor position with high responsivity.

Second Embodiment

Figure 4:
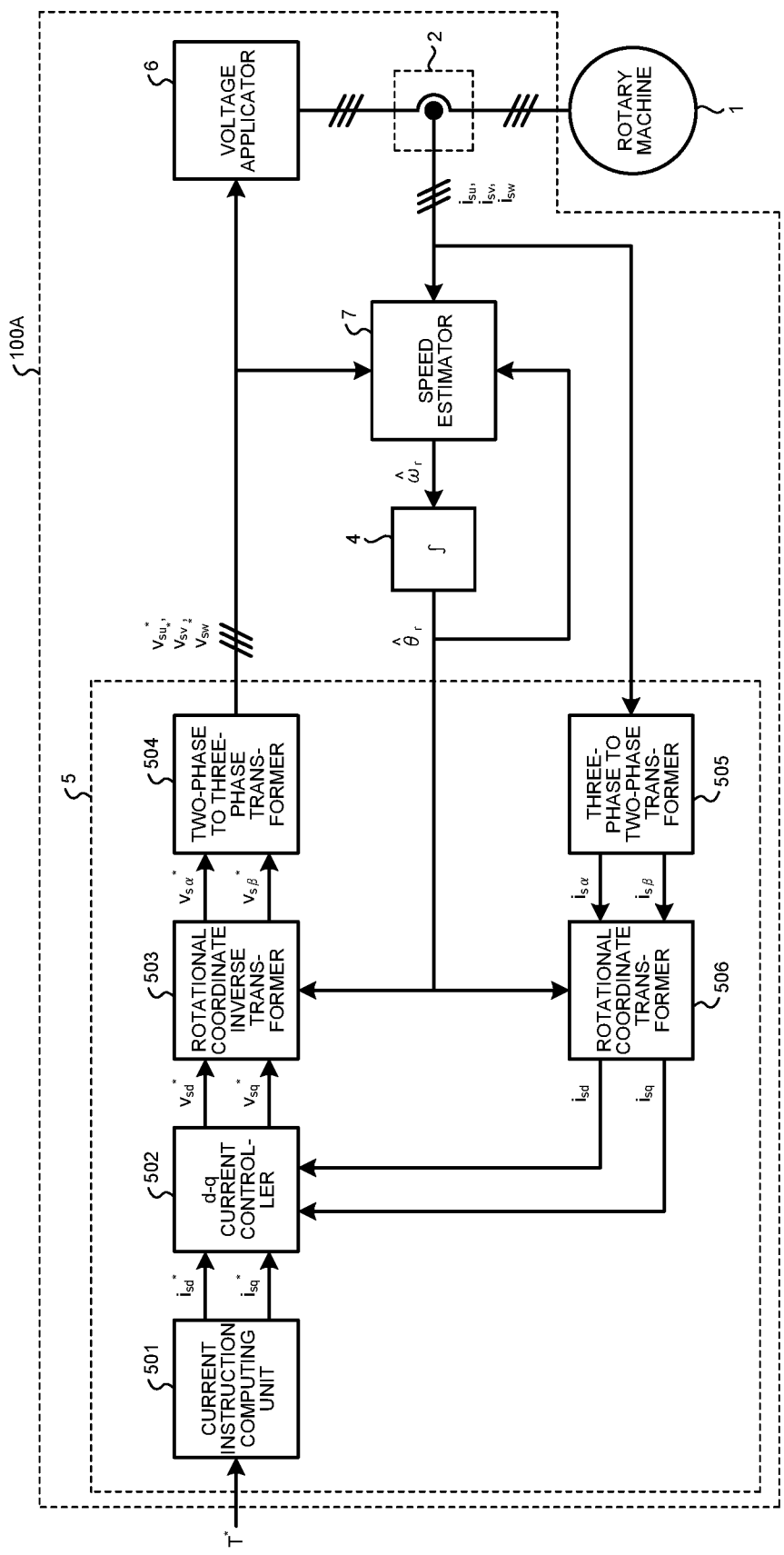
FIG. 4 is a diagram illustrating a configuration of a rotary machine control device according to a second embodiment of the present invention.

FIG. 4 is a diagram illustrating a configuration of a rotary machine control device according to a second embodiment of the present invention. In the second embodiment, the rotary machine control device is configured to extract motional electromotive force using a method different from the method of the first embodiment, and then estimate the rotational speed and the rotor position. A rotary machine control device 100A according to the second embodiment includes a speed estimator 7 in place of the speed estimator 3 illustrated in FIG. 1. The other part of the configuration is the same as, or similar to, the configuration of the first embodiment. The same or a similar configuration element is designated by the same reference character, and duplicate description thereof will be omitted.

Figure 5:
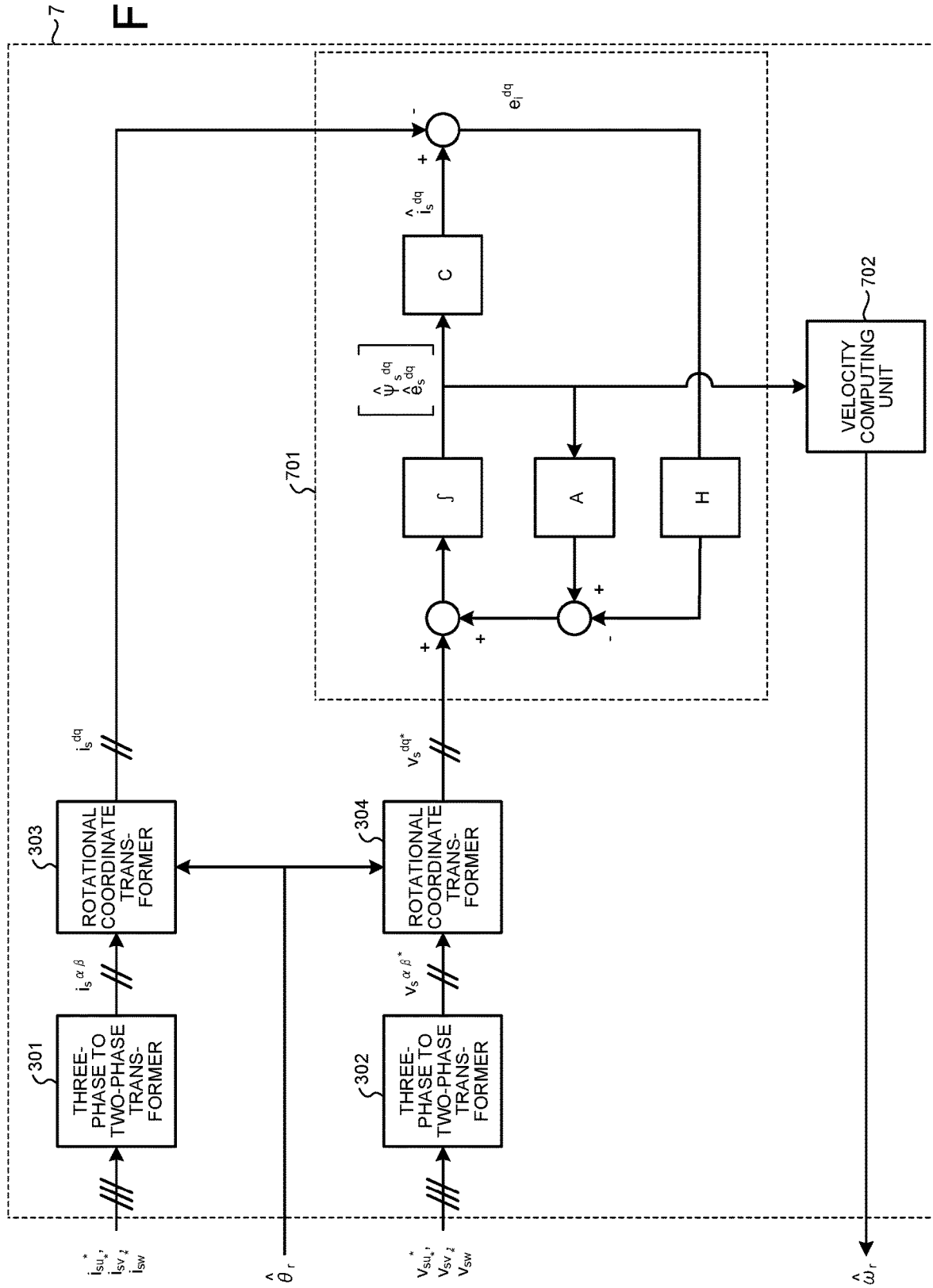
FIG. 5 is a diagram illustrating a configuration of a speed estimator illustrated in FIG. 4.

FIG. 5 is a diagram illustrating a configuration of the speed estimator illustrated in FIG. 4. The speed estimator 7 includes a disturbance observer 701 and a velocity computing unit 702 in place of the adaptive observer 305 and the adaptive estimator 306 illustrated in FIG. 2.

First, let the model of the rotary machine of Formulae (20) and (21) above be rewritten as Formulae (39), (40), and (41) below.

[Formula 39]

$$\frac{d}{dt}\psi_s^{dq} = -R_s \begin{bmatrix} \frac{1}{L_{sd}} & 0 \\ 0 & \frac{1}{L_{sq}} \end{bmatrix} \left(\psi_s^{dq} - e_s^{dq} + 2\omega_s \begin{bmatrix} 0 & \frac{L_{mac}}{L_{sq}} \\ \frac{L_{mac}}{L_{sd}} & 0 \end{bmatrix} \psi_s^{dq} - \omega_s J \psi_s^{dq} + v_s^{dq}\right) \quad (39)$$

[Formula 40]

$$\psi_s^{dq} = -\underbrace{\begin{bmatrix} L_{sd} & 0 \\ 0 & L_{sq} \end{bmatrix}}_{C^{-1}} i_s^{dq} \quad (40)$$

[Formula 41]

$$e_s^{dq} = 2\omega_r \begin{bmatrix} \frac{L_{mac}}{L_{sq}}\psi_{sq} \\ \frac{L_{mac}}{L_{sq}}\psi_{sd} \end{bmatrix} \quad (41)$$

The designation $e_s^{dq}$ of Formulae (39) and (41) above represents the induced voltage proportional to the rotational speed, of the motional electromotive force. The disturbance observer 701 is configured as expressed by Formula (42) below to perform estimation of this induced voltage.

[Formula 42]

$$\frac{d}{dt}\begin{bmatrix} \hat{\psi}_s^{dq} \\ \hat{e}_s^{dq} \end{bmatrix} = \begin{bmatrix} -\frac{R_s}{L_{sd}} & \omega_s\left(2\frac{L_{mac}}{L_{sq}}+1\right) & -1 & 0 \\ \omega_s\left(2\frac{L_{mac}}{L_{sd}}-1\right) & -\frac{R_s}{L_{sq}} & 0 & -1 \\ 0 & 0 & 0 & 0 \\ 0 & 0 & 0 & 0 \end{bmatrix} \begin{bmatrix} \hat{\psi}_s^{dq} \\ \hat{e}_s^{dq} \end{bmatrix} + \begin{bmatrix} v_s^{dq} \\ 0 \end{bmatrix} - H\left(\hat{i}_s^{dq} - i_s^{dq}\right) \quad (42)$$

At this point, appropriate designing of the observer gain H allows the estimated value $\hat{e}_s^{dq}$ of the induced voltage to converge to a true value. The velocity computing unit 702 estimates the rotational speed from the estimated value $\hat{e}_s^{dq}$ of the induced voltage proportional to the rotational speed, of the motional electromotive force, by Formula (43) below. Note that the d-axis component and the q-axis component of the estimated value $\hat{e}_s^{dq}$ of the induced voltage are respectively denoted by $\hat{e}_{sd}$ and $\hat{e}_{sq}$ in Formula (43) below.

[Formula 43]

$$\hat{\omega}_r = \left(\frac{L_{sq}}{2L_{mac}\psi_{sq}}\hat{e}_{sd} + \frac{L_{sd}}{2L_{mac}\psi_{sd}}\hat{e}_{sq}\right)/2 \quad (43)$$

The rotary machine control device 100A according to the second embodiment does not use an adaptive observer including an adaptive law, but uses the disturbance observer 701 to estimate the rotational speed and the rotor position from the induced voltage proportional to the rotational speed, of the motional electromotive force. Thus, the rotary machine control device 100A according to the second embodiment provides an unprecedented significant advantage in being capable of estimating the rotor position irrespective of the current flow direction of the rotary machine with a simpler configuration and with a smaller amount of computation for control. Moreover, an unprecedented, highly significant advantage is provided in that estimation of the rotational speed enables the rotor position to be estimated with higher responsivity.

Third Embodiment

Figure 6:
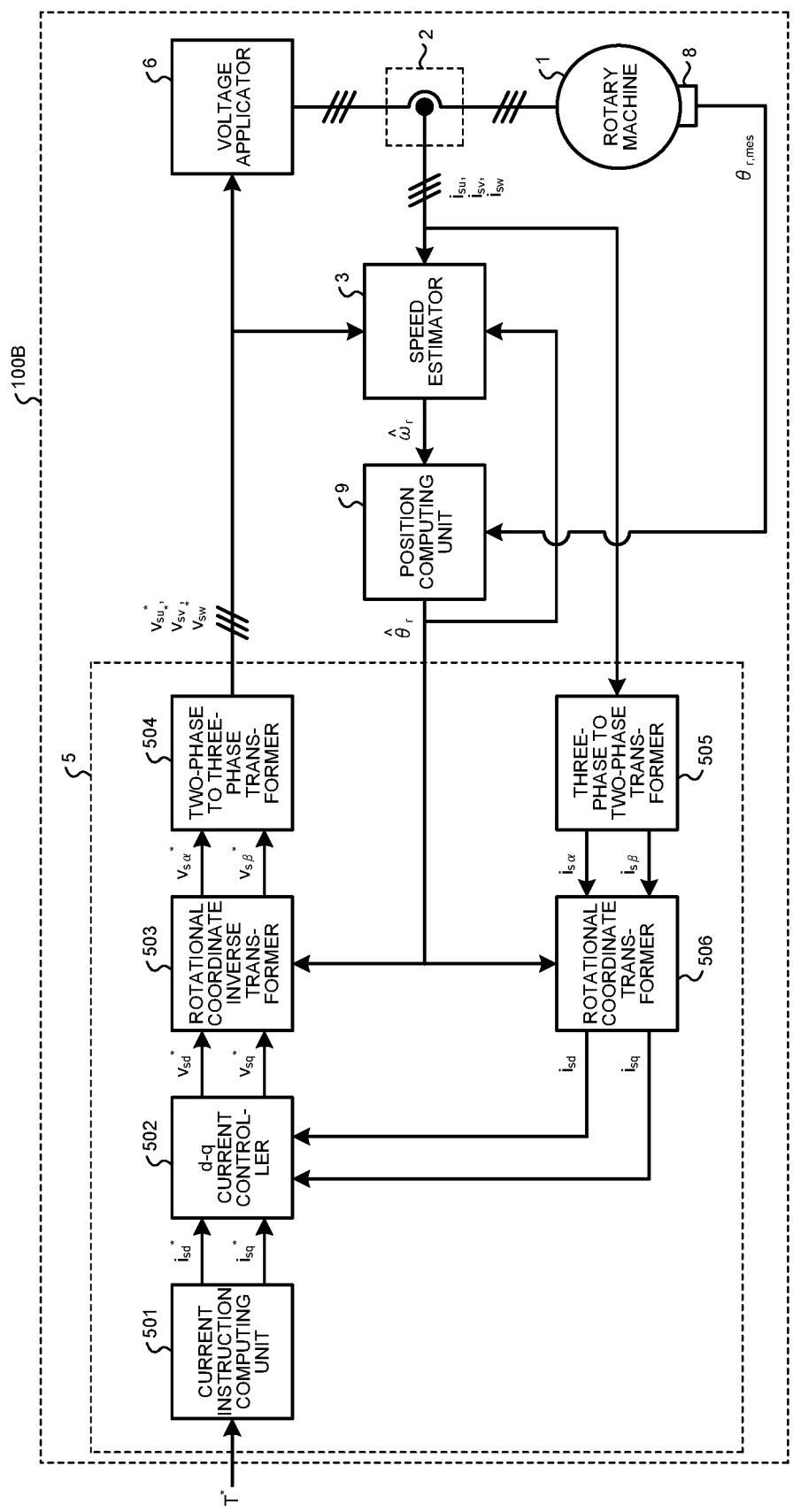
FIG. 6 is a diagram illustrating a configuration of a rotary machine control device according to a third embodiment of the present invention.

FIG. 6 is a diagram illustrating a configuration of a rotary machine control device according to a third embodiment of the present invention. In the first and second embodiments, when an error exists in the estimated rotational speed, the estimated rotor position computed by integrating this estimated rotational speed may have a large error. A rotary machine control device 100B according to the third embodiment is configured to stably drive the rotary machine even when an estimation error exists in the rotational speed. The rotary machine control device 100B according to the third embodiment includes a position computing unit 9 in place of the position computing unit 4 illustrated in FIG. 1, and also includes a position detector 8. The other part of the configuration is the same as, or similar to, the configuration of the first embodiment. The same or a similar configuration element is designated by the same reference character, and duplicate description thereof will be omitted.

The position detector 8 is a Hall sensor provided on the rotary machine 1, and outputs a rotor position $\theta_{r,mes}$ detected, every electrical angle of 60°. The position computing unit 9 estimates the estimated rotor position $\hat{\theta}_r$ from the estimated rotational speed $\hat{\omega}_r$ computed by the speed estimator 3 and from the rotor position $\theta_{r,mes}$ detected by the position detector 8.

Figure 7:
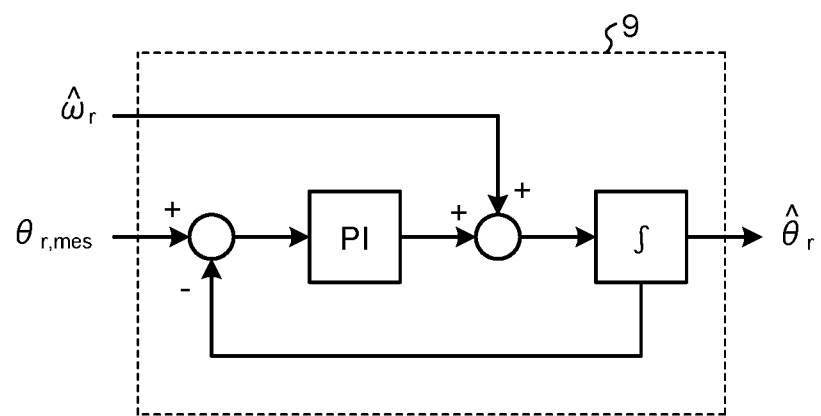
FIG. 7 is a diagram illustrating a configuration of a position computing unit illustrated in FIG. 6.

FIG. 7 is a diagram illustrating a configuration of the position computing unit illustrated in FIG. 6. The position computing unit 9 integrates the estimated rotational speed $\hat{\omega}_r$ to compute the estimated rotor position $\hat{\theta}_r$. Also, the position computing unit 9 provides PI control to allow the estimated rotor position $\hat{\theta}_r$ to follow the rotor position $\theta_{r,mes}$ detected by the position detector 8. The position computing unit 9 enables the rotor position to be estimated with high responsivity using the estimated rotational speed $\hat{\omega}_r$, and also the estimation error of the rotor position due to the estimation error of the rotational speed and/or the like to be corrected using the rotor position $\theta_{r,mes}$. Thus, the rotary machine control device 100B according to the third embodiment provides an unprecedented significant advantage in being capable of stably driving the rotary machine even when an error exists in the estimated rotational speed $\hat{\omega}_r$, in addition to the advantages of the first and second embodiments.

Fourth Embodiment

Figure 8:
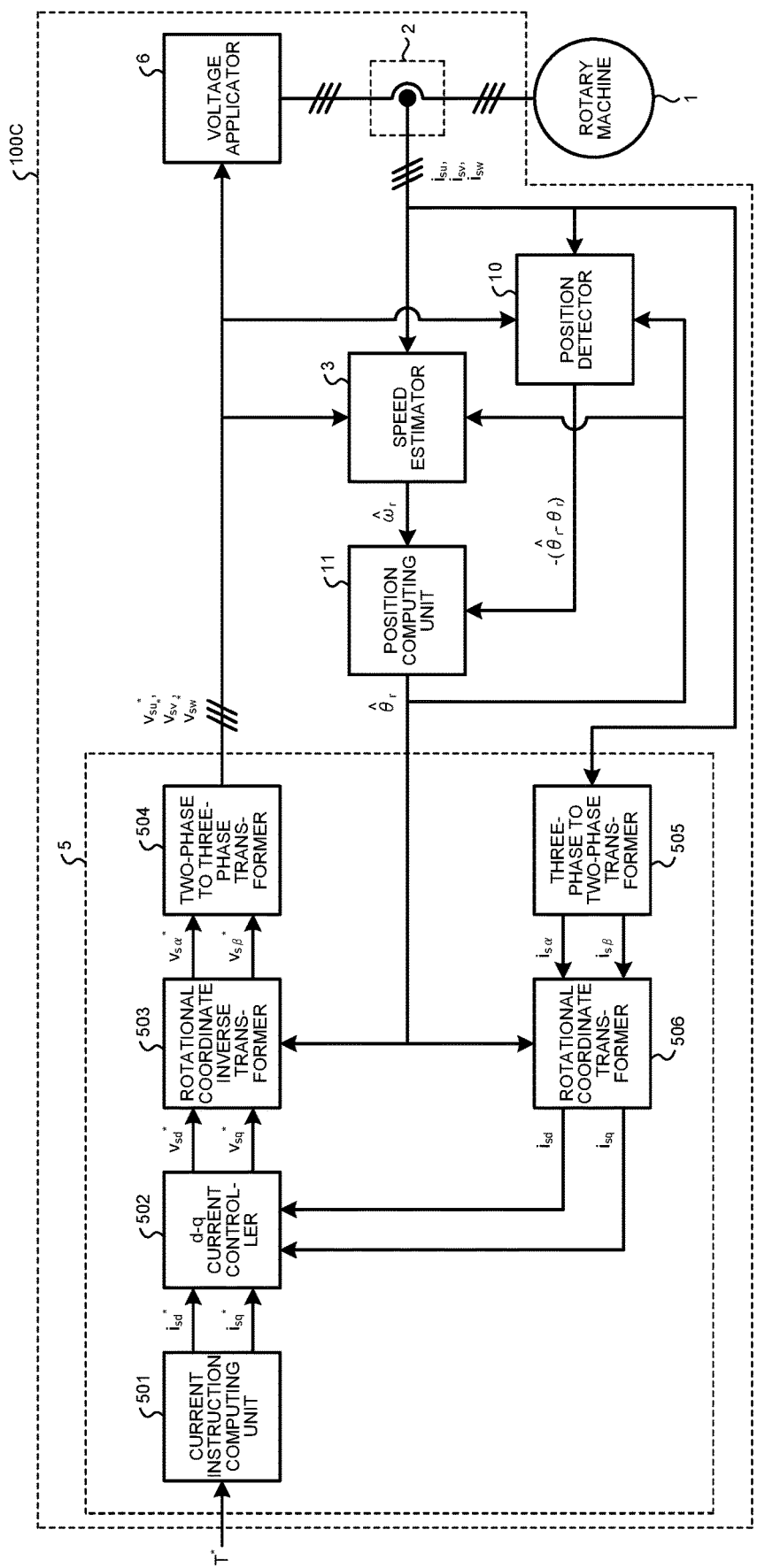
FIG. 8 is a diagram illustrating a configuration of a rotary machine control device according to a fourth embodiment of the present invention.

FIG. 8 is a diagram illustrating a configuration of a rotary machine control device according to a fourth embodiment of the present invention. In the third embodiment, the Hall sensor provided on the rotary machine 1 is used, and the rotor position $\theta_{r,mes}$ detected by the Hall sensor is used to correct the estimation error of the rotor position due to an estimation error of the rotational speed and/or the like. In this regard, configuring the rotary machine control device itself to serve as the position detector to estimate the rotor position eliminates the need for the Hall sensor to detect the rotor position. A rotary machine control device 100C according to the fourth embodiment includes a position detector 10 in place of the Hall sensor provided on the rotary machine 1, i.e., the position detector 8 illustrated in FIG. 6. The rotary machine control device 100C also includes a position computing unit 11 in place of the position computing unit 9 illustrated in FIG. 6. The rotary machine control device 100C is configured to correct the estimation error of the rotor position due to an estimation error of the rotational speed and/or the like, on the basis of the rotor position estimated using the position computing unit 11, and thus to stably drive the rotary machine. The other part of the configuration is the same as, or similar to, the configuration of the third embodiment. The same or a similar configuration element is designated by the same reference character, and duplicate description thereof will be omitted.

The position detector 10 computes the estimation error $-(\hat{\theta}_r - \theta_r)$ of the rotor position using the rotary machine voltage instructions $v_{su}^*$, $v_{sv}^*$, and $v_{sw}^*$, the rotary machine currents $i_{su}$, $i_{sv}$, and $i_{sw}$, and the estimated rotor position $\hat{\theta}_r$. The position computing unit 11 computes the estimated rotor position $\hat{\theta}_r$ from the estimation error $-(\hat{\theta}_r - \theta_r)$ of the rotor position and from the estimated rotational speed $\hat{\omega}_r$.

Figure 9:
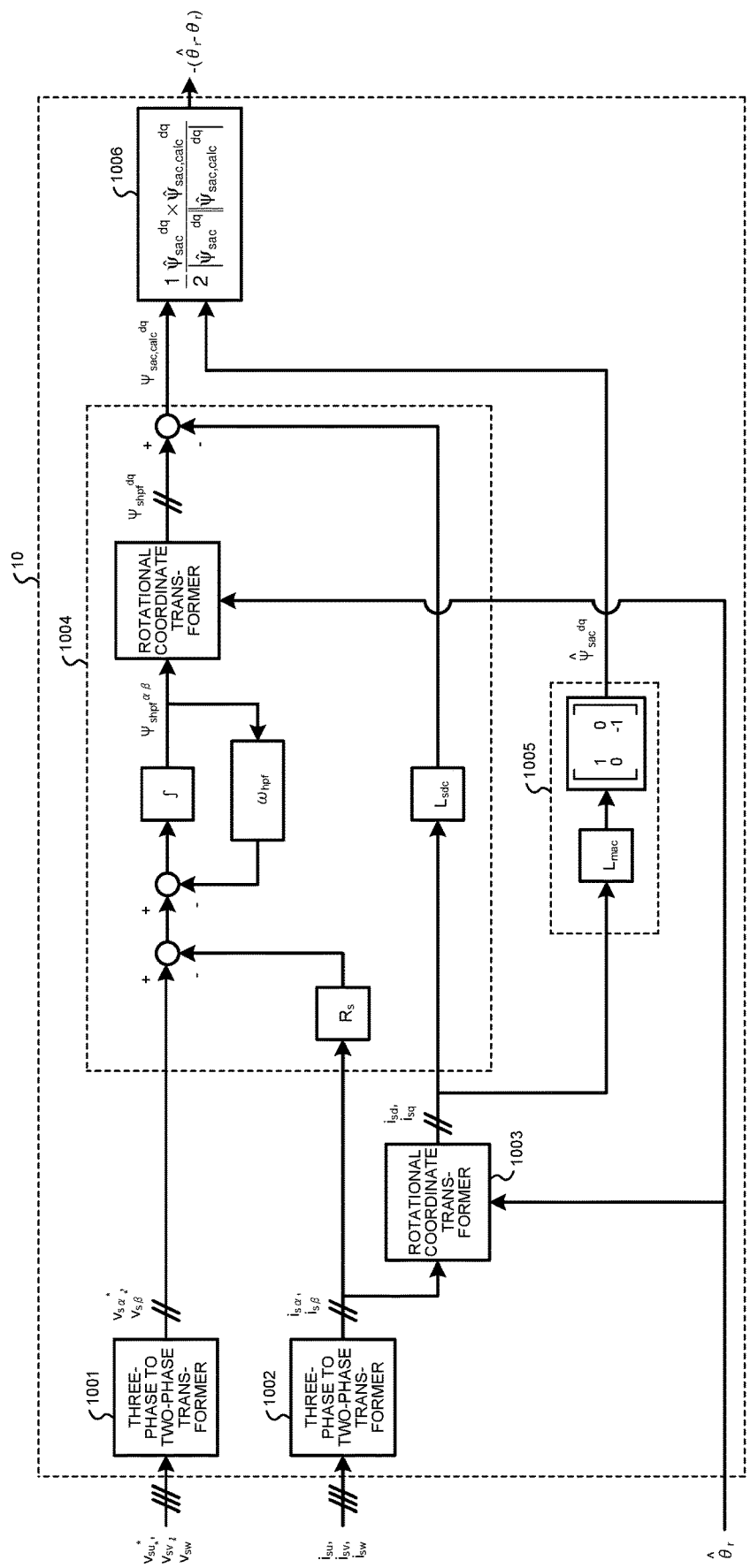
FIG. 9 is a diagram illustrating a configuration of a position detector illustrated in FIG. 8.

FIG. 9 is a diagram illustrating a configuration of the position detector illustrated in FIG. 8. The position detector 10 includes a three-phase to two-phase transformer 1001, a three-phase to two-phase transformer 1002, a rotational coordinate transformer 1003, a flux linkage inductance variable component computing unit 1004, a flux linkage inductance variable component estimator 1005, and a rotor position estimation error computing unit 1006.

The three-phase to two-phase transformer 1001 transforms the rotary machine voltage instructions $v_{su}^*$, $v_{sv}^*$, and $v_{sw}^*$ represented in the three-phase reference frame to the rotary machine voltage instructions $v_{s\alpha}^*$ and $v_{s\beta}^*$ represented in the two-phase rest frame.

The three-phase to two-phase transformer 1002 transforms the rotary machine currents $i_{su}$, $i_{sv}$, and $i_{sw}$ represented in the three-phase reference frame to the rotary machine currents $i_{s\alpha}$ and $i_{s\beta}$ represented in the two-phase rest frame.

The rotational coordinate transformer 1003 performs rotational coordinate transformation from the rotary machine currents $i_{s\alpha}$ and $i_{s\beta}$ represented in the two-phase rest frame to the d- and q-axis currents $i_{sd}$ and $i_{sq}$ represented in the two-phase rotating reference frame using the estimated rotor position $\hat{\theta}_r$.

An operation of the flux linkage inductance variable component computing unit 1004 will next be described. As used herein, the term "flux linkage inductance variable component" refers to the portion of flux linkage generated by the inductance variable component and the rotary machine current. Specifically, in the model of the rotary machine of Formulae (8), (9), and (10) above, the flux linkage $\Psi_s^{dq}$ can be expressed as Formula (44) below by dividing the corresponding expression into a term of the inductance average component $L_{sdc}$, which does not change with the rotor position, and a term of the inductance variable component $L_{mac}$, which changes with the rotor position.

[Formula 44]

$$\psi_s^{dq} = L_{sdc} i_s^{dq} + L_{mac} \begin{bmatrix} \cos(2(\theta_r - \theta_s)) & \sin(2(\theta_r - \theta_s)) \\ \sin(2(\theta_r - \theta_s)) & -\cos(2(\theta_r - \theta_s)) \end{bmatrix} i_s^{dq} \quad (44)$$

The second term of Formula (44) above represents the flux linkage inductance variable component. To compute the flux linkage inductance variable component, the flux linkage inductance variable component computing unit 1004 first computes the flux linkage $\Psi_s^{dq}$ of the rotary machine as shown by Formula (45) below. $R_s$ of Formula (45) below is the winding resistance.

[Formula 45]

$$\psi_s^{\alpha\beta} = \int (v_s^{\alpha\beta} - R_s i_s^{\alpha\beta}) dt \quad (45)$$

In addition, the integration of Formula (45) above can be expressed as Formula (46) below in the s domain of Laplace transform.

[Formula 46]

$$\psi_s^{\alpha\beta} = \frac{v_s^{\alpha\beta*} - R_s i_s^{\alpha\beta}}{s} \quad (46)$$

In a case of computing the flux linkage $\Psi_s^{\alpha\beta}$ of the rotary machine by integration, the initial value is typically indefinite. Therefore, a high-pass filter (HPF) is used having a cutoff frequency sufficiently lower than the fundamental frequency component of the flux linkage $\Psi_s^{\alpha\beta}$ of the rotary machine. The transfer function of such HPF is expressed as Formula (47) below, where $\omega_{hpf}$ represents the cutoff frequency.

[Formula 47]

$$G_{hpf}(s) = \frac{s}{s + \omega_{hpf}} \quad (47)$$

By applying this HPF to Formula (46) above, the flux linkage $\Psi_{shpf}^{\alpha\beta}$ can be calculated using Formula (48) below.

[Formula 48]

$$\psi_{shpf}^{\alpha\beta} = \frac{v_s^{\alpha\beta*} - R_s i_s^{\alpha\beta}}{s + \omega_{hpf}} \quad (48)$$

Formula (48) above can be rewritten as Formula (49) below.

[Formula 49]

$$\psi_{shpf}^{\alpha\beta} = \frac{v_s^{\alpha\beta*} - R_s i_s^{\alpha\beta} - \omega_{hpf}\psi_{shpf}^{\alpha\beta}}{s} \quad (49)$$

Furthermore, the flux linkage inductance variable component computing unit 1004 performs rotational coordinate transformation from the flux linkage $\Psi_{shpf}^{\alpha\beta}$ represented in the two-phase rest frame to the flux linkage $\Psi_{shpf}^{dq}$ represented in the two-phase rotating reference frame using the estimated rotor position $\hat{\theta}_r$. The flux linkage inductance variable component $\Psi_{sac,calc}^{dq}$ represented in the rotating reference frame is computed based on Formula (44) above as Formula (50) below. The flux linkage inductance variable component $\Psi_{sac,calc}^{dq}$ computed using Formula (50) below is hereinafter referred to as "flux linkage inductance variable component computed value".

[Formula 50]

$$\Psi_{sac,calc}^{dq} = \Psi_{shpf}^{dq} - L_{sdc} i_s^{dq} \quad (50)$$

The flux linkage inductance variable component estimator 1005 estimates, as shown in Formula (51) below, the flux linkage inductance variable component, which is represented by the second term of Formula (44) above, using the estimated rotor position $\hat{\theta}_r$ and the rotary machine current $i_s^{dq}$.

[Formula 51]

$$\hat{\psi}_{sac}^{dq} = L_{mac}\begin{bmatrix} \cos(2(\hat{\theta}_r - \theta_s)) & \sin(2(\hat{\theta}_r - \theta_s)) \\ \sin(2(\hat{\theta}_r - \theta_s)) & -\cos(2(\hat{\theta}_r - \theta_s)) \end{bmatrix} i_s^{dq} \quad (51)$$

In this regard, the estimated rotor position $\hat{\theta}_r$ is used as the control coordinate angle $\theta_s$ in Formula (51) above. Thus, Formula (51) above is simplified as shown in Formula (52) below.

[Formula 52]

$$\hat{\psi}_{sac}^{dq} = L_{mac}\begin{bmatrix} 1 & 0 \\ 0 & -1 \end{bmatrix} i_s^{dq} \quad (52)$$

$\hat{\Psi}_{sac}^{dq}$ of Formula (52) above represents the flux linkage inductance variable component estimated value computed by the rotary machine control device 100C according to the fourth embodiment.

The rotor position estimation error computing unit 1006 computes the estimation error $-(\hat{\theta}_r - \theta_r)$ of the rotor position using the flux linkage inductance variable component computed value and the flux linkage inductance variable component estimated value. At this point, the cross product of the flux linkage inductance variable component computed value and the flux linkage inductance variable component estimated value is expressed by Formula (53) below using the value resulting from calculation of Formula (50) above, i.e., the second term of Formula (44) above, and using Formula (51) above.

[Formula 53]

$$\hat{\psi}_{sac}^{dq} \times \psi_{sac,calc}^{dq} = |\hat{\psi}_{sac}^{dq}||\psi_{sac,calc}^{dq}|\sin(2(\theta_r - \hat{\theta}_r)) \quad (53)$$

Assuming here that the estimated value and the true value of the rotor position are nearly equal to each other, i.e., $\hat{\theta}_r \approx \theta_r$, the estimation error of the rotor position can be computed using Formula (54) below.

[Formula 54]

$$-(\hat{\theta}_r - \theta_r) = \frac{1}{2}\frac{\hat{\psi}_{sac}^{dq} \times \psi_{sac,calc}^{dq}}{|\hat{\psi}_{sac}^{dq}||\psi_{sac,calc}^{dq}|} \quad (54)$$

Figure 10:
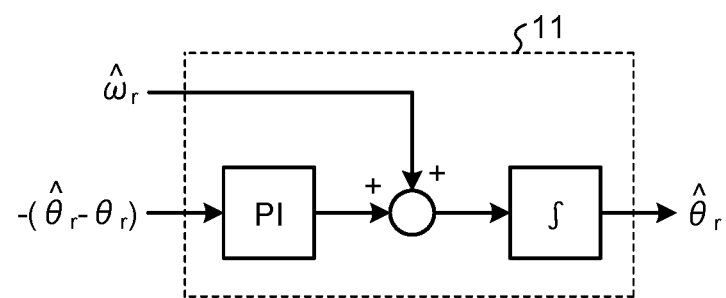
FIG. 10 is a diagram illustrating a configuration of a position computing unit illustrated in FIG. 8.

FIG. 10 is a diagram illustrating a configuration of the position computing unit illustrated in FIG. 8. The position computing unit 11 integrates the estimated rotational speed $\hat{\omega}_r$, and computes the estimated rotor position $\hat{\theta}_r$ using the estimated rotational speed that has been integrated. Also, the position computing unit 11 provides PI control to reduce the estimation error $-(\hat{\theta}_r - \theta_r)$ of the rotor position to zero. The position computing unit 11 enables the rotor position to be estimated with high responsivity using the estimated rotational speed $\hat{\omega}_r$, and also the estimation error of the rotor position due to an estimation error of the rotational speed and/or the like to be corrected using the rotor position estimated. Thus, the rotary machine control device 100C according to the fourth embodiment provides an unprecedented significant advantage in being capable of stably driving a rotary machine even when an error exists in the estimated rotational speed $\hat{\omega}_r$ without use of the Hall sensor of the third embodiment, in addition to the advantages of the first and second embodiments. In addition, since the flux linkage inductance variable component computed in the fourth embodiment has both components of the two respective phases, use of this flux linkage inductance variable component enables the rotor position to be estimated even when the rotary machine current has a value of zero in one phase. That is, the rotor position can be estimated irrespective of the current flow direction. Moreover, the rotary machine control device 100C according to the fourth embodiment eliminates the need to perform weighting depending on the current flow direction. Therefore, the rotary machine control device 100C according to the fourth embodiment provides an unprecedented significant advantage in being capable of estimating the rotor position irrespective of the current flow direction of the rotary machine, with a simpler configuration.

In this regard, the flux linkage inductance variable component estimated value can also be computed in the two-phase rest frame. Using the model of the rotary machine of Formulae (8) and (9) above, the flux linkage inductance variable component represented in the two-phase rest frame can be expressed by Formula (55) below.

[Formula 55]

$$\psi_{sac}^{\alpha\beta} = L_{mac}\begin{bmatrix} \cos(2\theta_r) & \sin(2\theta_r) \\ \sin(2\theta_r) & -\cos(2\theta_r) \end{bmatrix} i_s^{\alpha\beta} \quad (55)$$

Also, using Formula (55) above, the flux linkage inductance variable component estimated value can be expressed by Formula (56) below.

[Formula 56]

$$\hat{\psi}_{sac}^{\alpha\beta} = L_{mac}\begin{bmatrix} \cos(2\hat{\theta}_r) & \sin(2\hat{\theta}_r) \\ \sin(2\hat{\theta}_r) & -\cos(2\hat{\theta}_r) \end{bmatrix} i_s^{\alpha\beta} \quad (56)$$

The computed value of the flux linkage inductance variable component represented in the two-phase rest frame is obtained by Formula (57) below, using Formula (49) above of the flux linkage and the model of the rotary machine of Formulae (5) and (6) above.

[Formula 57]

$$\psi_{sac,calc}^{\alpha\beta} = \psi_{shpf}^{\alpha\beta} - L_{sdc} i_s^{\alpha\beta} \quad (57)$$

Also in the two-phase rest frame, similarly to the case of use of the two-phase rotating reference frame, the estimation error of the rotor position is computed by Formula (58) below using the flux linkage inductance variable component computed value and the flux linkage inductance variable component estimated value.

[Formula 58]

$$-(\hat{\theta}_r - \theta_r) = \frac{1}{2} \frac{\hat{\psi}_{sac}^{\alpha\beta} \times \psi_{sac,calc}^{\alpha\beta}}{|\hat{\psi}_{sac}^{\alpha\beta}||\psi_{sac,calc}^{\alpha\beta}|} \quad (58)$$

By using Formula (58) above, the rotor position can be estimated also in the two-phase rest frame similarly to the case of use of the two-phase rotating reference frame. However, the actual change in the inductance will not exactly follow a sine function or cosine function of $2\theta_r$, thereby causing an error in the estimated rotor position. In addition, computation of the flux linkage inductance variable component estimated value of Formula (56) above in the two-phase rest frame requires a sine function and a cosine function of $2\theta_r$, thereby increasing the amount of computation for control. To solve these problems, the rotary machine control device 100C according to the fourth embodiment computes the flux linkage inductance variable component, and also estimates the flux linkage inductance variable component, in the two-phase rotating reference frame to enable the rotor position to be accurately estimated with a small amount of computation for control. Moreover, Formula (52) above, which is an arithmetic equation for the flux linkage inductance variable component represented in the two-phase rotating reference frame, uses the inductance value on the d-axis in the rotating reference frame and the inductance value on the q-axis in the rotating reference frame, and this eliminates the need to express the inductance using a sine function or cosine function of $2\theta_r$, where $\theta_r$ represents the electrical angle of the rotor position. This prevents a rotor estimation error from occurring that would occur due to a condition in which the actual inductance of the rotary machine does not accurately follow a sine function or cosine function of $2\theta_r$. Furthermore, the fourth embodiment does not need a sine function or cosine function of $2\theta_r$ to estimate the flux linkage inductance variable component. Thus, the rotary machine control device 100C according to the fourth embodiment provides an unprecedented significant advantage in being capable of accurately estimating the rotor position with a small amount of computation for control.

Fifth Embodiment

Figure 11:
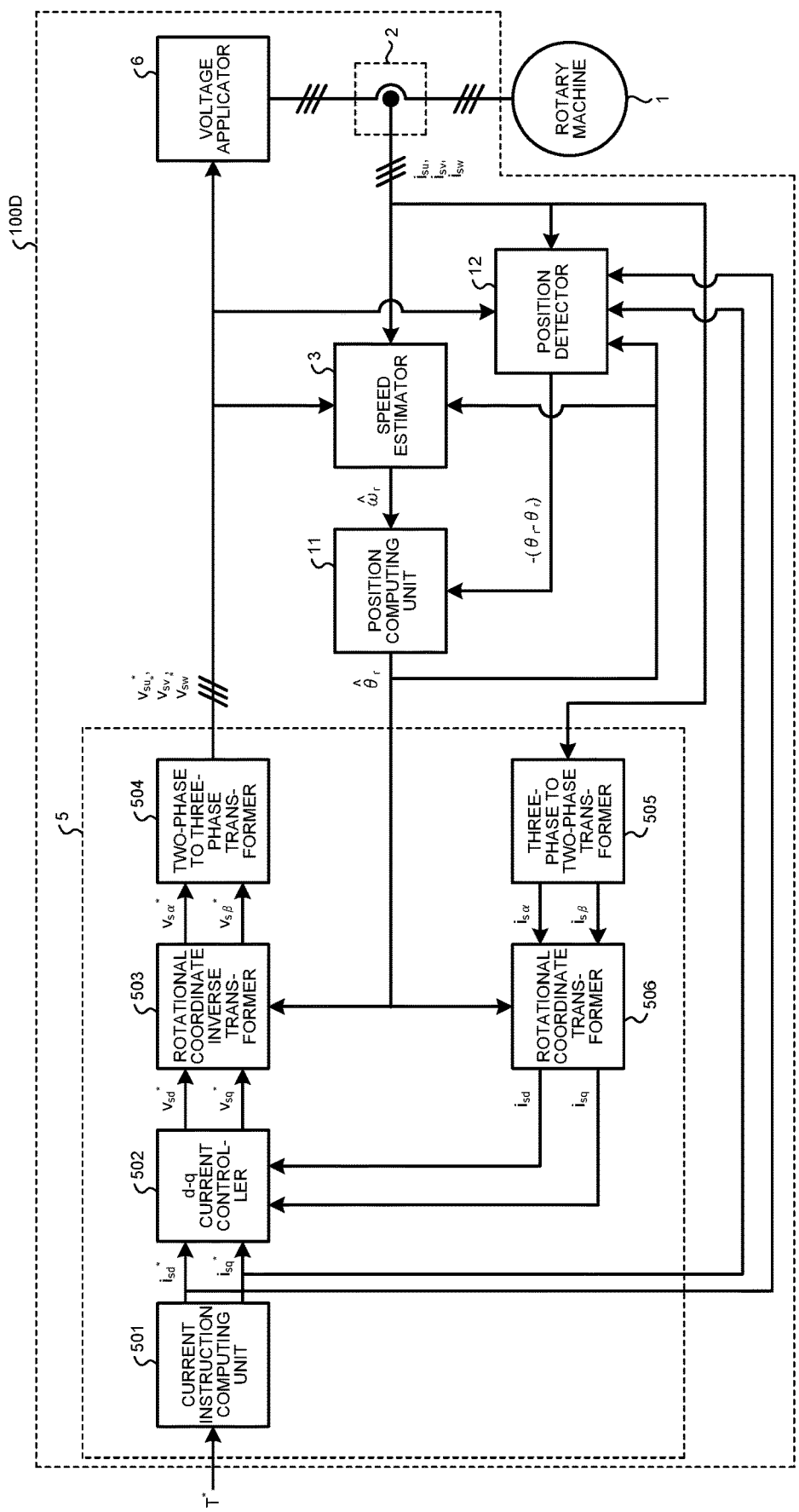
FIG. 11 is a diagram illustrating a configuration of a rotary machine control device according to a fifth embodiment of the present invention.

FIG. 11 is a diagram illustrating a configuration of a rotary machine control device according to a fifth embodiment of the present invention. The rotary machine control device 100C according to the fourth embodiment estimates the rotor position using a computed value and an estimated value of the flux linkage inductance variable component. In contrast, a rotary machine control device 100D according to the fifth embodiment is configured to estimate the rotor position using a computed value of the flux linkage inductance variable component, the current flow angle, and the rotor position. The rotary machine control device 100D includes a position detector 12 in place of the position detector 10 illustrated in FIG. 8. The other part of the configuration is the same as, or similar to, the configuration of the fourth embodiment. The same or a similar configuration element is designated by the same reference character, and duplicate description thereof will be omitted.

Figure 12:
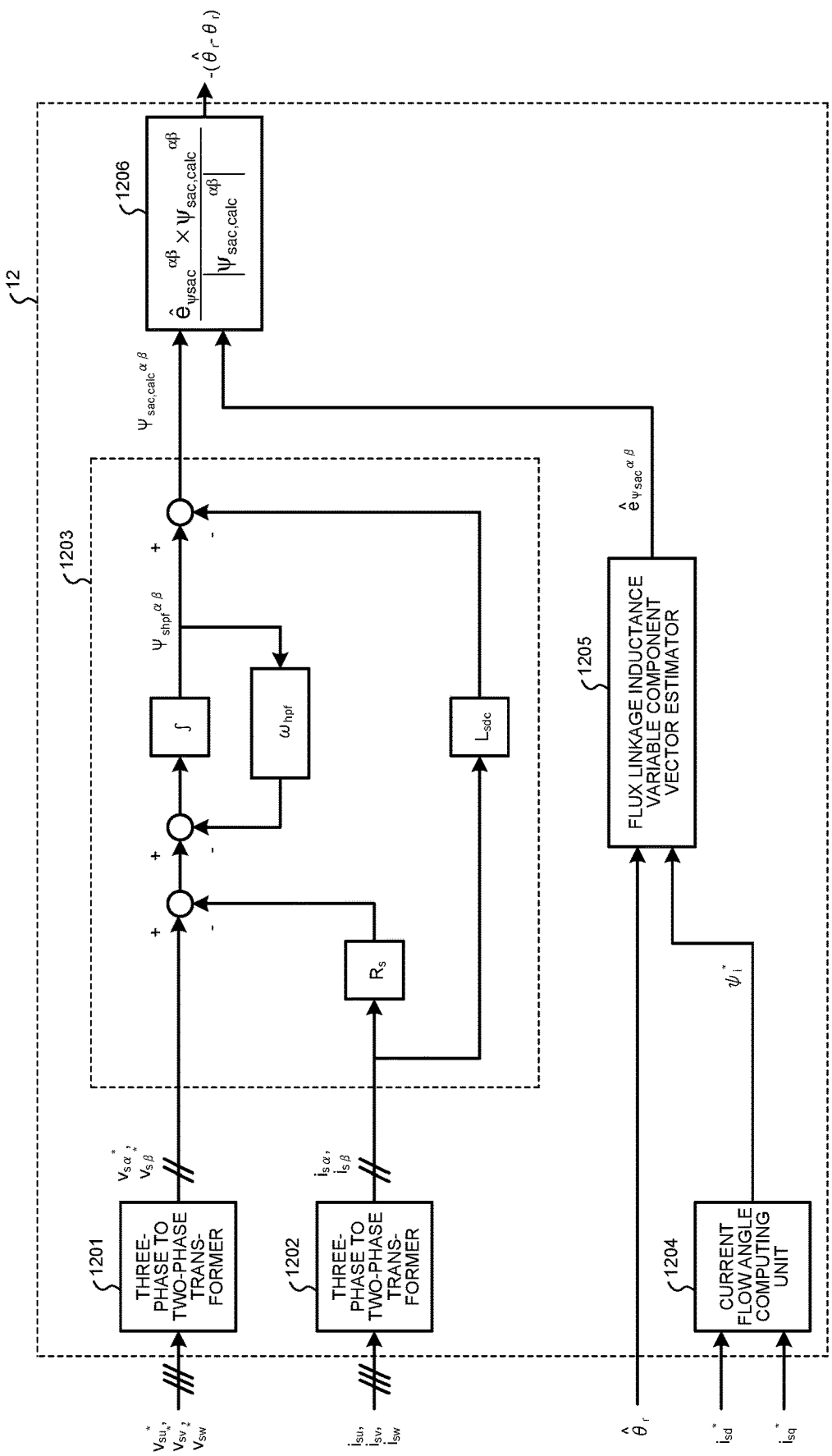
FIG. 12 is a diagram illustrating a configuration of a position detector illustrated in FIG. 11.

FIG. 12 is a diagram illustrating a configuration of the position detector illustrated in FIG. 11. The position detector 12 includes a three-phase to two-phase transformer 1201, a three-phase to two-phase transformer 1202, a flux linkage inductance variable component computing unit 1203, a current flow angle computing unit 1204, a flux linkage inductance variable component vector estimator 1205, and a rotor position estimation error computing unit 1206.

The three-phase to two-phase transformer 1201 transforms the rotary machine voltage instructions $v_{su}^*$, $v_{sv}^*$, and $v_{sw}^*$ represented in the three-phase reference frame to the rotary machine voltage instructions $v_{s\alpha}^*$ and $v_{s\beta}^*$ represented in the two-phase rest frame.

The three-phase to two-phase transformer 1202 transforms the rotary machine currents $i_{su}$, $i_{sv}$, and $i_{sw}$ represented in the three-phase reference frame to the rotary machine currents $i_{s\alpha}$ and $i_{s\beta}$ represented in the two-phase rest frame.

The flux linkage inductance variable component computing unit 1203 computes the flux linkage inductance variable component similarly to the fourth embodiment. However, as shown by Formula (57) above, computation in the fourth embodiment is performed for the computed value of the flux linkage inductance variable component represented in the two-phase rest frame.

Meanwhile, the flux linkage inductance variable component expressed by Formula (55) above is expressed by Formula (59) below using the rotary machine current computed using Formula (31) above.

[Formula 59]

$$\psi_{sac}^{\alpha\beta} = \sqrt{3}\, L_{mac} I_{ph} \underbrace{\begin{bmatrix} \cos(\theta_r - \varphi_i) \\ \sin(\theta_r - \varphi_i) \end{bmatrix}}_{e_{\psi sac}^{\alpha\beta}} \quad (59)$$

The flux linkage inductance variable component expressed by Formula (59) above rotates at a phase obtained by subtraction of the current flow angle of the rotary machine current from the rotor position. In addition, $e_{\psi sac}^{\alpha\beta}$ of Formula (59) above is referred to as flux linkage inductance variable component vector. The flux linkage inductance variable component vector $e_{\psi sac}^{\alpha\beta}$ is a vector in the same direction as the flux linkage inductance variable component.

The current flow angle computing unit 1204 computes, using Formula (60) below, a current flow angle instruction $\varphi_i^*$, which is an instruction on a current flow angle representing the angle between the current instruction and the actual rotor position, from the current instructions $i_{sd}^*$ and $i_{sq}^*$ represented in the two-phase rotating reference frame.

[Formula 60]

$$\phi_i^* = \arctan\left(\frac{i_{sq}^*}{i_{sd}^*}\right) \quad (60)$$

The flux linkage inductance variable component vector estimator 1205 computes, using Formula (61) below, a flux linkage inductance variable component vector estimated value $\hat{e}_{\psi sac}^{\alpha\beta}$ using the current flow angle instruction $\varphi_i^*$ and the estimated rotor position $\hat{\theta}_r$.

[Formula 61]

$$\hat{e}_{\psi sac}^{\alpha\beta} = \begin{bmatrix} \cos(\hat{\theta}_r - \varphi_i^*) \\ \sin(\hat{\theta}_r - \varphi_i^*) \end{bmatrix} \quad (61)$$

The rotor position estimation error computing unit 1206 computes the estimation error $-(\hat{\theta}_r - \theta_r)$ of the rotor position on the basis of the flux linkage inductance variable component computed value and the flux linkage inductance variable component vector estimated value. Assuming that the current flow angle $\varphi_i$ is equal to the current flow angle instruction $\varphi_i^*$, the cross product of the flux linkage inductance variable component computed value and the flux linkage inductance variable component vector estimated value is expressed by Formula (62) below. Note that the flux linkage inductance variable component computed value is the result of computation of Formula (55) above using Formulae (49) and (50) above using the rotary machine voltage instruction and the rotary machine current.

[Formula 62]

$$\hat{e}_{\psi sac}^{\alpha\beta} \times \psi_{sac,calc}^{\alpha\beta} = |\psi_{sac,calc}^{\alpha\beta}| \sin(\theta_r - \hat{\theta}_r) \quad (62)$$

Assuming here that the estimated value and the true value of the rotor position are nearly equal to each other, i.e., $\hat{\theta}_r \approx \theta_r$, the estimation error of the rotor position can be computed using Formula (63) below.

[Formula 63]

$$-(\hat{\theta}_r - \theta_r) = \frac{\hat{e}_{\psi sac}^{\alpha\beta} \times \psi_{sac,calc}^{\alpha\beta}}{|\psi_{sac,calc}^{\alpha\beta}|} \quad (63)$$

Thus, the rotary machine control device 100D according to the fifth embodiment provides an unprecedented significant advantage in being capable of stably driving a rotary machine even when an error exists in the estimated rotational speed $\hat{\omega}_r$ without use of the Hall sensor of the third embodiment, in addition to the advantages of the first and second embodiments. In addition, the rotary machine control device 100D according to the fifth embodiment can compute the flux linkage inductance variable component vector estimated value using a vector in the same direction as the flux linkage inductance variable component, that is, using Formulae (59) and (61) above. Note that, as shown by Formula (61) above, the flux linkage inductance variable component vector estimated value is computed using the current flow angle instruction $\varphi_i^*$ and the estimated rotor position $\hat{\theta}_r$. Since the flux linkage inductance variable component and the flux linkage inductance variable component vector each have both components of the two respective phases, use of the flux linkage inductance variable component and the flux linkage inductance variable component vector enables the position to be estimated irrespective of the current flow direction. Moreover, the rotary machine control device 100D according to the fifth embodiment eliminates the need to perform weighting depending on the current flow direction. Therefore, the rotary machine control device 100D according to the fifth embodiment provides an unprecedented significant advantage in being capable of estimating the rotor position irrespective of the current flow direction of the rotary machine, with a simpler configuration.

The functionalities of each of the rotary machine control devices 100, 100A, 100B, 100C, and 100D according to the first to fifth embodiments can be implemented in a processing circuit. The functionalities respectively correspond to the current detector 2, the voltage applicator 6, the speed estimators 3 and 7, the position computing units 4, 9, and 11, the position detectors 10 and 12, and the controller 5.

Figure 13:
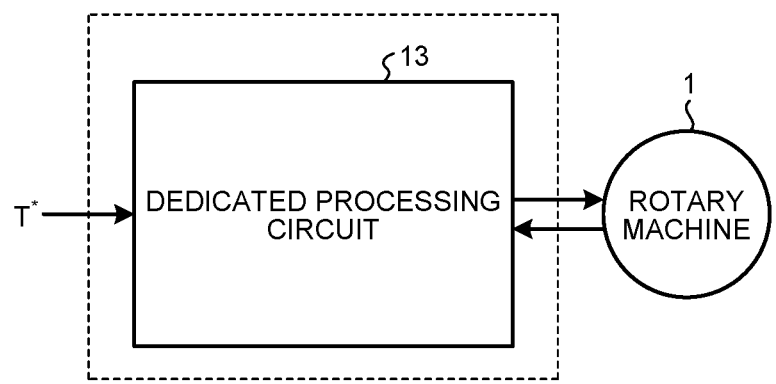
FIG. 13 is a diagram illustrating a first hardware configuration example of the rotary machine control devices according to the first to fifth embodiments of the present invention.

FIG. 13 is a diagram illustrating a first hardware configuration example of the rotary machine control devices according to the first to fifth embodiments of the present invention. FIG. 13 illustrates an example in which the foregoing processing circuit is implemented in a dedicated hardware element such as a dedicated processing circuit 13. As illustrated in FIG. 13, in the case of use of a dedicated hardware element, the dedicated processing circuit 13 is a single circuit, a set of multiple circuits, a programmed processor, a set of multiple programmed processors, an application specific integrated circuit (ASIC), a field-programmable gate array (FPGA), or a combination thereof. The functionalities described above may each be implemented in an individual processing circuit, or may be collectively implemented in a processing circuit.

Figure 14:
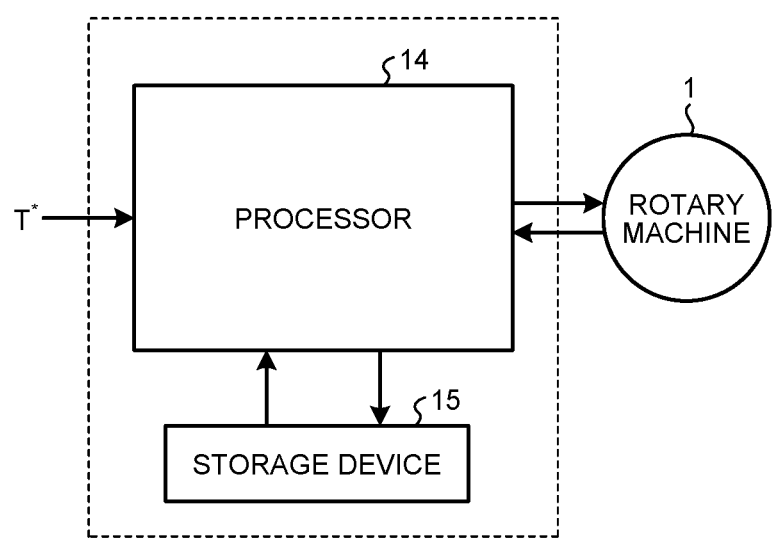
FIG. 14 is a diagram illustrating a second hardware configuration example of the rotary machine control devices according to the first to fifth embodiments.

FIG. 14 is a diagram illustrating a second hardware configuration example of the rotary machine control devices according to the first to fifth embodiments. FIG. 14 illustrates an example in which the foregoing processing circuit is implemented by a processor 14 and a storage device 15. As illustrated in FIG. 14, in the case of use of the processor 14 and the storage device 15, each of the functionalities described above is implemented in software, firmware, or a combination thereof. The software or firmware is described as a program or programs, and is/are stored in the storage device 15. The processor 14 reads and executes a program stored in the storage device 15. It can also be said that these programs cause a computer to perform a procedure or method to be performed for each of the functionalities described above. The storage device 15 is a semiconductor memory such as a random access memory (RAM), a read-only memory (ROM), a flash memory, an erasable programmable read-only memory (EPROM), or an electrically erasable programmable read-only memory (EEPROM) (registered trademark). The semiconductor memory may be a non-volatile memory or a volatile memory. Also, the storage device 15 may not be a semiconductor memory, but rather be a magnetic disk, a flexible disk, an optical disk, a compact disc, a MiniDisc, or a digital versatile disc (DVD).

In addition, each of the functionalities described above may be implemented partially in hardware and partially in software or firmware. As a specific example, the functionalities of the current detector 2, the voltage applicator 6, and the position detector 8 are implemented in a dedicated hardware element, while the functionalities of the speed estimators 3 and 7, the position computing units 4, 9, and 11, the position detectors 10 and 12, and the controller 5 are implemented by the processor 14 and the storage device 15.

In the first through fifth embodiments, the current instruction for the torque of the rotary machine is selected to minimize the RMS value, i.e., the copper loss of the rotary machine, but needless to say, may also be selected to reduce the flux linkage or the loss. In addition, the observers of the first embodiment and of the second embodiment use the flux linkage as the state variable on the basis of the model of Formula (19) above or on the model of Formulae (20) and (21), but may also use the rotary machine current as the state variable on the basis of the model of Formula (16) above or the model of Formula (17) above. Moreover, the motional electromotive force is extracted using the adaptive observer in the first embodiment and using the disturbance observer in the second embodiment, but the motional electromotive force represented by the third term of each of Formulae (16) and (17) above or the motional electromotive force represented by the second term of each of Formulae (19) and (20) above may also be computed from the voltage and the current of the rotary machine. Furthermore, in the third embodiment, the description has been given of an example in which a Hall sensor is used as the position detector 8, but a position detector such as a resolver or an encoder may also be used in place of the Hall sensor. In addition, for the purpose of facilitating an understanding of the description, the first through fifth embodiments have been described such that the controller 5, the speed estimators 3 and 7, and the position detector 12 redundantly perform coordinate transformation of the voltage and the current of the rotary machine, but these coordinate transformation operations may be performed using functionality common to the controller 5, the speed estimators 3 and 7, and the position detector 12. Moreover, the first through fifth embodiments have been described on the assumption of use with a synchronous reluctance motor, the rotary machine 1 may be any rotary machine whose inductance value changes with the rotor position, and may thus be a surface magnet synchronous motor, an interior magnet synchronous motor, or the like.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

1 rotary machine; 2 current detector; 3, 7 speed estimator; 4, 9, 11 position computing unit; 5 controller; 6 voltage applicator; 8, 10, 12 position detector; 13 dedicated processing circuit; 14 processor; 15 storage device; 100, 100A, 100B, 100C, 100D control device; 301, 302, 505, 1001, 1002, 1201, 1202 three-phase to two-phase transformer; 303, 304, 506, 1003 rotational coordinate transformer; 305 adaptive observer; 306 adaptive estimator; 501 current instruction computing unit; 502 d-q current controller; 503 rotational coordinate inverse transformer; 504 two-phase to three-phase transformer; 701 disturbance observer; 702 velocity computing unit; 1004, 1203 flux linkage inductance variable component computing unit; 1005 flux linkage inductance variable component estimator; 1006, 1206 rotor position estimation error computing unit; 1204 current flow angle computing unit; 1205 flux linkage inductance variable component vector estimator.

The invention claimed is:

1. A rotary machine control device for controlling a rotary machine whose inductance has an inductance variable component that changes with a rotor position that is a rotational position of a rotor, the rotary machine control device comprising:
   a current detector to detect a rotary machine current flowing through the rotary machine;
   circuitry configured to estimate a speed to compute an estimated rotational speed that is an estimated value of a rotational speed of the rotor, on a basis of motional electromotive force that is induced voltage generated due to a change in the inductance with a position of the rotor;
   position computing circuitry to compute an estimated position that is an estimated value of the rotor position, using the estimated rotational speed;
   a controller to output a rotary machine voltage instruction to drive the rotary machine, on a basis of the rotary machine current and the estimated position; and
   voltage applicator circuitry to apply a voltage to the rotary machine on a basis of the rotary machine voltage instruction, wherein
   the induced voltage includes a first voltage component obtained by multiplication of a current value and a derivative value of the current value of each phase by an inductance value of each phase, and a second voltage component obtained by a product of a derivative value of the inductance of each phase and the current value of each phase, and
   the circuitry configured to estimate a speed computes the estimated rotational speed on a basis of the second voltage component.

2. The rotary machine control device according to claim 1, wherein
   when the inductance variable component is represented by $L_{mac}$ shown in Formula (1) below,
   the induced voltage includes $v_{emf1}^{dq}$ expressed by a first motional electromotive force term shown in Formula (2) below, or includes $v_{emf2}^{dq}$ expressed by a second motional electromotive force term shown in Formula (3) below:

[Formula 1]
$$L_{mac} = \frac{L_{sd} - L_{sq}}{2} \quad (1)$$

[Formula 2]
$$v_{emf1}^{dq} = 2\omega_r \begin{bmatrix} 0 & L_{mac} \\ L_{mac} & 0 \end{bmatrix} i_s^{dq} \quad (2)$$

[Formula 3]
$$v_{emf2}^{dq} = 2\omega_r \begin{bmatrix} 0 & \frac{L_{mac}}{L_{sq}} \\ \frac{L_{mac}}{L_{sd}} & 0 \end{bmatrix} \psi_s^{dq} \quad (3)$$

where $i_s^{dq}$ represents the rotary machine current represented in a two-phase rotating reference frame, $\Psi_s^{dq}$ represents magnetic flux linkage represented in the two-phase rotating reference frame, $\omega_r$ represents the rotational speed of the rotor, $L_{sd}$ represents d-axis inductance, and $L_{sq}$ represents q-axis inductance.

3. The rotary machine control device according to claim 1, wherein
the circuitry configured to estimate a speed estimates the induced voltage using disturbance circuitry configured to observe.

4. The rotary machine control device according to claim 1, comprising:
a position detector to detect or estimate the rotor position at intervals, wherein
the position computing circuitry computes the estimated position that is the estimated value of the rotor position using the rotor position detected or estimated at the intervals by the position detector and using the estimated rotational speed.

5. The rotary machine control device according to claim 4, wherein
the position detector estimates the rotor position using the inductance variable component and a magnetic flux linkage inductance variable component generated by the rotary machine current.

6. The rotary machine control device according to claim 5, wherein
the inductance of the rotary machine includes a first component that does not change with the rotor position and a second component that changes at a frequency twice as high as an electrical angle of the rotor position, and
the inductance variable component is the second component.

7. The rotary machine control device according to claim 5, wherein
the position detector estimates the rotor position using a magnetic flux linkage inductance variable component computed value that is the magnetic flux linkage inductance variable component computed from the rotary machine voltage instruction and from the rotary machine current, and a magnetic flux linkage inductance variable component estimated value that is the magnetic flux linkage inductance variable component estimated from the rotary machine current, from the inductance variable component, and from the rotor position.

8. The rotary machine control device according to claim 7, wherein
the position detector computes an estimation error of the rotor position from a cross product of the magnetic flux linkage inductance variable component computed value and the magnetic flux linkage inductance variable component estimated value.

9. The rotary machine control device according to claim 5, wherein
the position detector computes or estimates the magnetic flux linkage inductance variable component on a rotating reference frame synchronized with rotation of the rotary machine.

10. The rotary machine control device according to claim 5, wherein
the position detector estimates the rotor position from the magnetic flux linkage inductance variable component computed value computed from the rotary machine voltage instruction and the rotary machine current, from a current flow angle that is an angular difference between the rotary machine current and the rotor position, and from the rotor position.

11. The rotary machine control device according to claim 10, wherein
the position detector estimates, from the current flow angle and the rotor position, a magnetic flux linkage inductance variable component vector that is a vector in a same direction as the magnetic flux linkage inductance variable component, and computes an estimation error of the rotor position from a cross product of the magnetic flux linkage inductance variable component computed value and an estimated value of the magnetic flux linkage inductance variable component vector that is estimated.

12. A rotary machine control device for controlling a rotary machine whose inductance has an inductance variable component that changes with a rotor position that is a rotational position of a rotor, the rotary machine control device comprising:
a current detector to detect a rotary machine current flowing through the rotary machine;
circuitry configured to estimate a speed to compute an estimated rotational speed that is an estimated value of a rotational speed of the rotor, on a basis of motional electromotive force that is induced voltage generated due to a change in the inductance with a position of the rotor;
position computing circuitry to compute an estimated position that is an estimated value of the rotor position, using the estimated rotational speed;
a controller to output a rotary machine voltage instruction to drive the rotary machine, on a basis of the rotary machine current and the estimated position; and
voltage applicator circuitry to apply a voltage to the rotary machine on a basis of the rotary machine voltage instruction, wherein
the induced voltage is obtained by interchanging values of two respective phases of the rotary machine current in a two-phase rotating reference frame based on the rotor position, and multiplying resultant values by a same factor.

13. A rotary machine control device for controlling a rotary machine whose inductance has an inductance variable component that changes with a rotor position that is a rotational position of a rotor, the rotary machine control device comprising:
- a current detector to detect a rotary machine current flowing through the rotary machine;
- circuitry configured to estimate a speed to compute an estimated rotational speed that is an estimated value of a rotational speed of the rotor, on a basis of motional electromotive force that is induced voltage generated due to a change in the inductance with a position of the rotor;
- position computing circuitry to compute an estimated position that is an estimated value of the rotor position, using the estimated rotational speed;
- a controller to output a rotary machine voltage instruction to drive the rotary machine, on a basis of the rotary machine current and the estimated position; and
- voltage applicator circuitry to apply a voltage to the rotary machine on a basis of the rotary machine voltage instruction, wherein
- the circuitry configured to estimate a speed estimates a magnetic flux linkage of the rotary machine or the rotary machine current as a state variable using circuitry configured to observe, and estimates a velocity of the rotor from an estimation error of the state variable in association with the induced voltage.

14. The rotary machine control device according to claim 13, wherein
the circuitry configured to estimate a speed estimates the magnetic flux linkage of the rotary machine or the rotary machine current using two-dimensional circuitry configured to observe.

15. The rotary machine control device according to claim 13, wherein
the circuitry configured to observe computes a first induced voltage of the rotary machine proportional to an angular velocity at which a control reference frame rotates, and a second induced voltage proportional to a rotational speed of the rotary machine, in a two-phase rotating reference frame rotating at an angular velocity at which the control reference frame rotates, and estimates the rotational speed of the rotor from the second induced voltage.

16. The rotary machine control device according to claim 13, wherein
when $L_{sd}$ of Formula (4) below represents d-axis inductance, and $L_{sq}$ of Formula (4) below represents q-axis inductance,
the speed estimator computes the rotational speed using an arithmetic equation including Formula (5) below or Formula (6) below:

[Formula 4]
$$C^{-1} = \begin{bmatrix} L_{sd} & 0 \\ 0 & L_{sq} \end{bmatrix} \quad (4)$$

[Formula 5]
$$e_{\omega 1} = \left( \begin{bmatrix} 0 & 1 \\ 1 & 0 \end{bmatrix} \hat{i}_s^{dq} \right)^T (\hat{\psi}_s^{dq} - \psi_s^{dq}) \quad (5)$$

[Formula 6]
$$e_{\omega 2} = \left( \begin{bmatrix} 0 & 1 \\ 1 & 0 \end{bmatrix} \hat{i}_s^{dq} \right)^T \underbrace{C^{-1} (\hat{i}_s^{dq} - i_s^{dq})}_{e_i^{dq}} \quad (6)$$

[Formula 7]
$$L_{mac} = \frac{L_{sd} - L_{sq}}{2} \quad (7)$$

where $i_s^{dq}$ represents the rotary machine current represented in a two-phase rotating reference frame, $\Psi_s^{dq}$ represents magnetic flux linkage represented in the two-phase rotating reference frame, $i_s^{\wedge dq}$ represents an estimated value of the rotary machine current represented in the two-phase rotating reference frame, $\Psi_s^{\wedge dq}$ represents an estimated value of the magnetic flux linkage represented in the two-phase rotating reference frame, and $L_{mac}$ shown in Formula (7) above represents the inductance variable component.

\* \* \* \* \*